United States Patent
Gupta et al.

(10) Patent No.: US 12,250,556 B2
(45) Date of Patent: *Mar. 11, 2025

(54) INTERFACES FOR CREATING RADIO-BASED PRIVATE NETWORKS

(71) Applicant: Amazon Technologies, Inc., Seattle, WA (US)

(72) Inventors: Diwakar Gupta, Seattle, WA (US); Leslie Andrew Prock, Seattle, WA (US); Kaixiang Hu, Fremont, CA (US); Upendra Bhalchandra Shevade, Washington, DC (US); Shane Ashley Hall, Kirkland, WA (US); Sahil Mansukhlal Koladiya, San Jose, CA (US); Ishwardutt Parulkar, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,851

(22) Filed: Nov. 24, 2023

(65) Prior Publication Data
US 2024/0171983 A1    May 23, 2024

Related U.S. Application Data

(63) Continuation of application No. 17/360,143, filed on Jun. 28, 2021, now Pat. No. 11,871,240.

(51) Int. Cl.
*H04W 16/02* (2009.01)
*G06Q 10/0833* (2023.01)
*H04W 4/50* (2018.01)

(52) U.S. Cl.
CPC ........ *H04W 16/02* (2013.01); *G06Q 10/0833* (2013.01); *H04W 4/50* (2018.02)

(58) Field of Classification Search
CPC ..... H04W 16/02; H04W 4/50; H04W 84/105; H04W 24/02; H04W 8/183; H04W 16/16; G06Q 10/0833
See application file for complete search history.

(56) References Cited

U.S. PATENT DOCUMENTS

| 7,151,780 B1 | 12/2006 | Belscher et al. |
| 7,448,080 B2 | 11/2008 | Karjala et al. |

(Continued)

FOREIGN PATENT DOCUMENTS

| CA | 3033307 C | * | 5/2021 | ........... G06Q 30/016 |
| CN | 1985532 A | | 6/2007 | |

(Continued)

OTHER PUBLICATIONS

Prados-Garzon, J., Ameigeiras, P., Ordonez-Lucena, J., Munoz, P., Adamuz-Hinojosa, O., & Camps-Mur, D. (2021). 5G non-public networks: Standardization, architectures and challenges. IEEE Access, 9, 153893-153908. doi:http://dx.doi.org/10.1109/ACCESS.2021.3127482 (Year: 2021).*

(Continued)

*Primary Examiner* — Yuwen Pan
*Assistant Examiner* — Swati Jain
(74) *Attorney, Agent, or Firm* — Perilla Knox & Hildebrandt LLP; Thomas B. Hildebrandt

(57) ABSTRACT

Disclosed are various embodiments for interfaces for creating radio-based private networks. In one embodiment, a request is received via an interface to create a radio-based private network for a customer. The request indicates a quantity of wireless devices that will connect to the radio-based private network. A quantity of radio units to serve the radio-based private network is determined based at least in part on the quantity of wireless devices. The radio units are preconfigured to implement a radio access network for the (Continued)

radio-based private network. A shipment is initiated to the customer of the radio units that have been preconfigured. Resources in a cloud provider network are provisioned to function as a core network for the radio-based private network.

20 Claims, 10 Drawing Sheets

(56) References Cited

U.S. PATENT DOCUMENTS

| | | |
|---|---|---|
| 8,230,050 B1 | 7/2012 | Brandwine et al. |
| 9,253,616 B1 | 2/2016 | Haney |
| 9,756,485 B2 | 9/2017 | Pinard et al. |
| 9,820,212 B2 | 11/2017 | Mukherjee et al. |
| 10,044,678 B2 | 8/2018 | Van Der et al. |
| 10,243,819 B1 | 3/2019 | Chheda et al. |
| 10,719,799 B1 | 7/2020 | Harris et al. |
| 10,750,366 B1 | 8/2020 | Gundavelli et al. |
| 10,785,652 B1 | 9/2020 | Ravindranath et al. |
| 10,827,329 B1 | 11/2020 | Dowlatkhah et al. |
| 10,880,176 B2 | 12/2020 | Zhang et al. |
| 10,958,583 B2 | 3/2021 | Gatchalian et al. |
| 11,039,359 B1 | 6/2021 | Paczkowski et al. |
| 11,095,559 B1 | 8/2021 | Garvia et al. |
| 11,259,160 B1 | 2/2022 | Belser et al. |
| 11,443,353 B1 | 9/2022 | Davis et al. |
| 11,500,688 B2 | 11/2022 | Liu et al. |
| 11,601,348 B2 | 3/2023 | Gupta et al. |
| 11,627,472 B2 | 4/2023 | Gupta et al. |
| 11,711,317 B1* | 7/2023 | Hanahan ............... H04L 47/821 709/226 |
| 11,871,240 B2 | 1/2024 | Gupta et al. |
| 2005/0041676 A1 | 2/2005 | Weinstein et al. |
| 2006/0160565 A1 | 7/2006 | Singh et al. |
| 2007/0010245 A1 | 1/2007 | Levitan |
| 2008/0058027 A1 | 3/2008 | Klein |
| 2008/0102957 A1 | 5/2008 | Burman et al. |
| 2009/0088135 A1 | 4/2009 | Kekki et al. |
| 2010/0199325 A1 | 8/2010 | Raleigh |
| 2011/0237251 A1 | 9/2011 | Chow et al. |
| 2012/0108229 A1 | 5/2012 | Arranz et al. |
| 2013/0132971 A1 | 5/2013 | Assuncao et al. |
| 2014/0067758 A1 | 3/2014 | Boldyrev et al. |
| 2014/0279122 A1 | 9/2014 | Luna |
| 2015/0046600 A1 | 2/2015 | Kim |
| 2016/0028471 A1 | 1/2016 | Boss et al. |
| 2016/0036861 A1 | 2/2016 | Mattes et al. |
| 2016/0142911 A1 | 5/2016 | Kreiner et al. |
| 2017/0013476 A1 | 1/2017 | Suthar et al. |
| 2017/0026335 A1 | 1/2017 | Dhulipala et al. |
| 2017/0048390 A1 | 2/2017 | Bhatia et al. |
| 2017/0054595 A1 | 2/2017 | Zhang et al. |
| 2017/0150420 A1 | 5/2017 | Olsson et al. |
| 2017/0245316 A1 | 8/2017 | Salkintzis et al. |
| 2017/0371717 A1 | 12/2017 | Kiess et al. |
| 2018/0097657 A1 | 4/2018 | Dao et al. |
| 2018/0123878 A1 | 5/2018 | Li et al. |
| 2018/0176886 A1 | 6/2018 | Kodaypak et al. |
| 2018/0227433 A1 | 8/2018 | Raleigh |
| 2018/0288622 A1 | 10/2018 | Maria et al. |
| 2018/0332441 A1 | 11/2018 | Shaw et al. |
| 2018/0343567 A1 | 11/2018 | Ashrafi |
| 2018/0352501 A1 | 12/2018 | Zhang et al. |
| 2018/0368053 A1 | 12/2018 | Wei et al. |
| 2019/0037409 A1 | 1/2019 | Wang et al. |
| 2019/0053104 A1 | 2/2019 | Qiao et al. |
| 2019/0132781 A1 | 5/2019 | Arnold et al. |
| 2019/0159015 A1 | 5/2019 | Qiao et al. |
| 2019/0159146 A1 | 5/2019 | Sun et al. |
| 2019/0166506 A1* | 5/2019 | Ashrafi ............... H04B 1/0003 |
| 2019/0174536 A1 | 6/2019 | Han et al. |
| 2019/0191329 A1 | 6/2019 | Gundavelli et al. |
| 2019/0199597 A1 | 6/2019 | Valisammagari et al. |
| 2019/0268781 A1 | 8/2019 | Nilssson et al. |
| 2019/0289613 A1 | 9/2019 | Fanelli et al. |
| 2019/0289647 A1 | 9/2019 | Li |
| 2019/0356743 A1 | 11/2019 | Park et al. |
| 2019/0373443 A1 | 12/2019 | Palaniappan et al. |
| 2019/0387401 A1 | 12/2019 | Liao et al. |
| 2020/0014762 A1 | 1/2020 | Li et al. |
| 2020/0057860 A1 | 2/2020 | Patil et al. |
| 2020/0112492 A1 | 4/2020 | Chatras et al. |
| 2020/0162348 A1* | 5/2020 | Suthar ............... H04L 41/0893 |
| 2020/0195521 A1 | 6/2020 | Bogineni et al. |
| 2020/0235952 A1 | 7/2020 | Mukherjee et al. |
| 2020/0267596 A1 | 8/2020 | Sudarsan et al. |
| 2020/0275313 A1 | 8/2020 | He et al. |
| 2020/0275410 A1 | 8/2020 | Kodaypak et al. |
| 2020/0287800 A1 | 9/2020 | Xu et al. |
| 2020/0328904 A1 | 10/2020 | Mirza et al. |
| 2020/0337111 A1 | 10/2020 | Shi et al. |
| 2020/0366677 A1 | 11/2020 | Draznin et al. |
| 2020/0367109 A1 | 11/2020 | Chen et al. |
| 2020/0374143 A1 | 11/2020 | Mukherjee et al. |
| 2020/0379805 A1 | 12/2020 | Porter et al. |
| 2020/0382374 A1 | 12/2020 | Yi et al. |
| 2021/0037544 A1 | 2/2021 | Andrews et al. |
| 2021/0067516 A1* | 3/2021 | de Neef ............... H04L 63/102 |
| 2021/0084536 A1 | 3/2021 | Chou et al. |
| 2021/0105656 A1 | 4/2021 | Estevez et al. |
| 2021/0120408 A1 | 4/2021 | Pazhyannur et al. |
| 2021/0144198 A1 | 5/2021 | Yu et al. |
| 2021/0144517 A1 | 5/2021 | Guim et al. |
| 2021/0168052 A1 | 6/2021 | Parulkar et al. |
| 2021/0176646 A1 | 6/2021 | Pabla et al. |
| 2021/0185533 A1 | 6/2021 | Ficara et al. |
| 2021/0194771 A1 | 6/2021 | Sridhar et al. |
| 2021/0194825 A1* | 6/2021 | Goodman ............... G06F 16/29 |
| 2021/0258971 A1 | 8/2021 | Vivanco et al. |
| 2021/0266990 A1 | 8/2021 | Cui et al. |
| 2021/0320897 A1 | 10/2021 | Stojanovski et al. |
| 2021/0329583 A1 | 10/2021 | Baek et al. |
| 2021/0368349 A1 | 11/2021 | Bandyopadhyay et al. |
| 2022/0007451 A1 | 1/2022 | Wang et al. |
| 2022/0014512 A1 | 1/2022 | Raleigh et al. |
| 2022/0060350 A1 | 2/2022 | Dimitrovski et al. |
| 2022/0124560 A1 | 4/2022 | Yeh et al. |
| 2022/0141192 A1* | 5/2022 | Silveira ............... H04L 63/0823 726/15 |
| 2022/0174504 A1 | 6/2022 | Gupta et al. |
| 2022/0191112 A1 | 6/2022 | Gupta et al. |
| 2022/0191706 A1 | 6/2022 | Gupta et al. |
| 2022/0201593 A1 | 6/2022 | Baek et al. |
| 2022/0247678 A1* | 8/2022 | Atwal ............... H04L 45/645 |
| 2022/0255830 A1 | 8/2022 | Lee |
| 2022/0279023 A1* | 9/2022 | Solari ............... H04W 12/069 |
| 2022/0279354 A1* | 9/2022 | Chandrappa ........ H04W 12/086 |
| 2022/0311821 A1* | 9/2022 | Shah ............... H04L 12/66 |
| 2022/0393956 A1* | 12/2022 | Venkata ............... H04W 40/246 |
| 2023/0208729 A1 | 6/2023 | Gupta et al. |
| 2023/0232246 A1 | 7/2023 | Gupta et al. |

FOREIGN PATENT DOCUMENTS

| | | |
|---|---|---|
| CN | 105262664 A | 1/2016 |
| CN | 106304035 A | 1/2017 |
| CN | 106464742 A | 2/2017 |
| CN | 108604334 A | 9/2018 |
| CN | 109952741 A | 6/2019 |
| CN | 110875847 A | 3/2020 |
| CN | 116746190 A | 9/2023 |
| CN | 116803117 A | 9/2023 |
| CN | 117413559 A | 1/2024 |
| EP | 4260593 A1 | 10/2023 |
| EP | 4260594 A1 | 10/2023 |
| EP | 4364457 A1 | 5/2024 |
| JP | 2020518932 A | 6/2020 |
| JP | 2020123895 A | 8/2020 |
| JP | 7470872 B2 | 4/2024 |
| JP | 7566182 B2 | 10/2024 |
| KR | 1020050102087 A | 10/2005 |
| KR | 1020170013390 A | 2/2017 |

(56) References Cited

FOREIGN PATENT DOCUMENTS

| | | |
|---|---|---|
| KR | 1020180086523 A | 1/2020 |
| KR | 1020170020877 B1 | 2/2020 |
| KR | 102168188 B1 | 10/2020 |
| KR | 1020190088066 A | 1/2021 |
| WO | 2007008601 A2 | 1/2007 |
| WO | 2019222925 A1 | 11/2019 |
| WO | 2020005276 A1 | 1/2020 |
| WO | 2020123633 A1 | 6/2020 |
| WO | 2020170076 A1 | 8/2020 |
| WO | 2020200436 A1 | 10/2020 |
| WO | 2021097253 A1 | 5/2021 |
| WO | 2021119296 A1 | 6/2021 |
| WO | 2022125858 A1 | 6/2022 |
| WO | 2022125890 A1 | 6/2022 |
| WO | 2023278179 A1 | 1/2023 |

OTHER PUBLICATIONS

Decision to Grant for Japanese Application No. 2023-579619 mailed Sep. 3, 2024.

Office Action for Japanese Application No. 2023-579619 mailed Jul. 2, 2024.

Office Action for Korean Application No. 10-2023-7045479 mailed Jun. 27, 2024.

Chirivella-Perez, Enrique, et al. "Orchestration architecture for automatic deployment of 5G services from bare metal in mobile edge computing infrastructure." Wireless Communications and Mobile Computing, Wiley Hindawi, vol. 2018, pp. 1-18 (2018).

Decision to Grant for Japanese Application No. 2023-535393 mailed Mar. 8, 2024.

Decision to Grant for Japanese Application No. 2023-535478 mailed May 28, 2024.

Final Office Action for U.S. Appl. No. 17/118,563 mailed Jul. 15, 2022.

U.S. Appl. No. 17/118,574, filed Dec. 10, 2020, Non-Final Office Action dated Apr. 4, 2022.

Gonzales, et al., H2020 5g-Crosshaul Project Grant No. 671598, D4.1: Initial design of 5G-Crosshaul Applications and Algorithms, 5G Crosshaul, Jan. 1. (Jan. 1, 2018), XP055498958. * Uploaded into 2 separate parts due to size .*.

International Search Report and Written Opinion for PCT/US2021/062750 mailed May 23, 2022.

International Search Report and Written Opinion for PCT/US2021/062795 mailed Mar. 30, 2022.

International Search Report and Written Opinion for PCT/US22/033933 mailed Oct. 12, 2024.

Nokia Corp., Press Release, available at https://www.nokia.com/about-us/news/releases/2020/07/21/nokia-announces-first-commercial-5g-standalone-sa-private-wireless-networking-solutions-for-enterprise-customers/, Jul. 21, 2020 (last visited Mar. 19, 2024).

Non-Final Office Action for U.S. Appl. No. 17/360,143 mailed Mar. 16, 2023.

Notice of Allowance for Korean Application No. 10-2023-7023268 mailed Mar. 21, 2024.

Notice of Allowance for U.S. Appl. No. 17/118,563 mailed Nov. 3, 2022.

Notice of Allowance for U.S. Appl. No. 17/118,570 mailed Nov. 25, 2022.

Notice of Allowance for U.S. Appl. No. 17/360,143 mailed Aug. 24, 2023.

Office Action for Chinese Application No. 2021800921705 mailed Mar. 21, 2024.

Office Action for Chinese Application No. 202180092171.X mailed Jan. 18, 2024.

Office Action for Chinese Application No. 202280039178X mailed May 25, 2024.

Office Action for Japanese Application No. 2023-535393 mailed Oct. 31, 2023.

Office Action for Japanese Patent Application No. 2023-535478 mailed Jan. 4, 2024.

Office Action for Korean Application No. 10-2023-7023268 mailed Oct. 1, 2023.

Office Action for Korean Application No. 10-2023-7023271 mailed Jan. 5, 2024.

PCT Patent Application No. PCT/US2021/062526 filed on Dec. 9, 2021, International Search Report and Written Opinion dated Mar. 30, 2022.

Taleb Tarik et al: "EASE: EPC as a service to ease mobile core network deployment over cloud", IEEE Network, IEEE Service Center, New York, NY, US, vol. 29, No. 2, Mar. 1, 2015 (Mar. 1, 2015), pp. 78-88, XP011576781, ISSN: 0890-8044, DOI: 10.1109/MNET.2015.7064907 [retrieved on Mar. 20, 2015] abstract p. 78-p. 87.

U.S. Appl. No. 17/206,025, filed Mar. 18, 2021, Notice of Allowance dated Apr. 1, 2022.

U.S. Appl. No. 17/118,558, filed Dec. 10, 2020, Non-Final Office Action dated Jun. 22, 2022.

U.S. Appl. No. 17/118,563, filed Dec. 10, 2020, Final Office Action dated Jun. 16, 2022.

U.S. Appl. No. 17/118,563, filed Dec. 10, 2020, Non-Final Office Action dated Feb. 15, 2022.

U.S. Appl. No. 17/118,565, filed Dec. 10, 2020, Non-Final Office Action dated Mar. 10, 2021.

U.S. Appl. No. 17/118,565, filed Dec. 10, 2020, Notice of Allowance dated Jun. 28, 2021.

U.S. Appl. No. 17/118,565, filed Dec. 10, 2020, Notice of Allowance dated Oct. 18, 2021.

U.S. Appl. No. 17/118,565, filed Dec. 10, 2020.

U.S. Appl. No. 17/118,568, filed Dec. 10, 2020, First Action Interview Pilot Program dated Apr. 14, 2021.

U.S. Appl. No. 17/118,568, filed Dec. 10, 2020, Notice of Allowance dated Dec. 8, 2021.

U.S. Appl. No. 17/118,569, filed Dec. 10, 2020, Non-Final Office Action dated Jun. 24, 2022.

U.S. Appl. No. 17/118,569, filed Dec. 10, 2020.

* cited by examiner

INTERFACES FOR CREATING RADIO-BASED PRIVATE NETWORKS

CROSS-REFERENCE TO RELATED APPLICATIONS

This application is a continuation of, and claims priority to, U.S. patent application Ser. No. 17/360,143, entitled "INTERFACES FOR CREATING RADIO-BASED PRIVATE NETWORKS," and filed on Jun. 28, 2021, which is incorporated herein by reference in its entirety.

BACKGROUND 5G is the fifth-generation technology standard for broadband cellular networks, which is planned eventually to take the place of the fourth-generation (4G) standard of Long-Term Evolution (LTE). 5G technology will offer greatly increased bandwidth, thereby broadening the cellular market beyond smartphones to provide last-mile connectivity to desktops, set-top boxes, laptops, Internet of Things (IoT) devices, and so on. Some 5G cells may employ frequency spectrum similar to that of 4G, while other 5G cells may employ frequency spectrum in the millimeter wave band. Cells in the millimeter wave band will have a relatively small coverage area but will offer much higher throughput than 4G.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
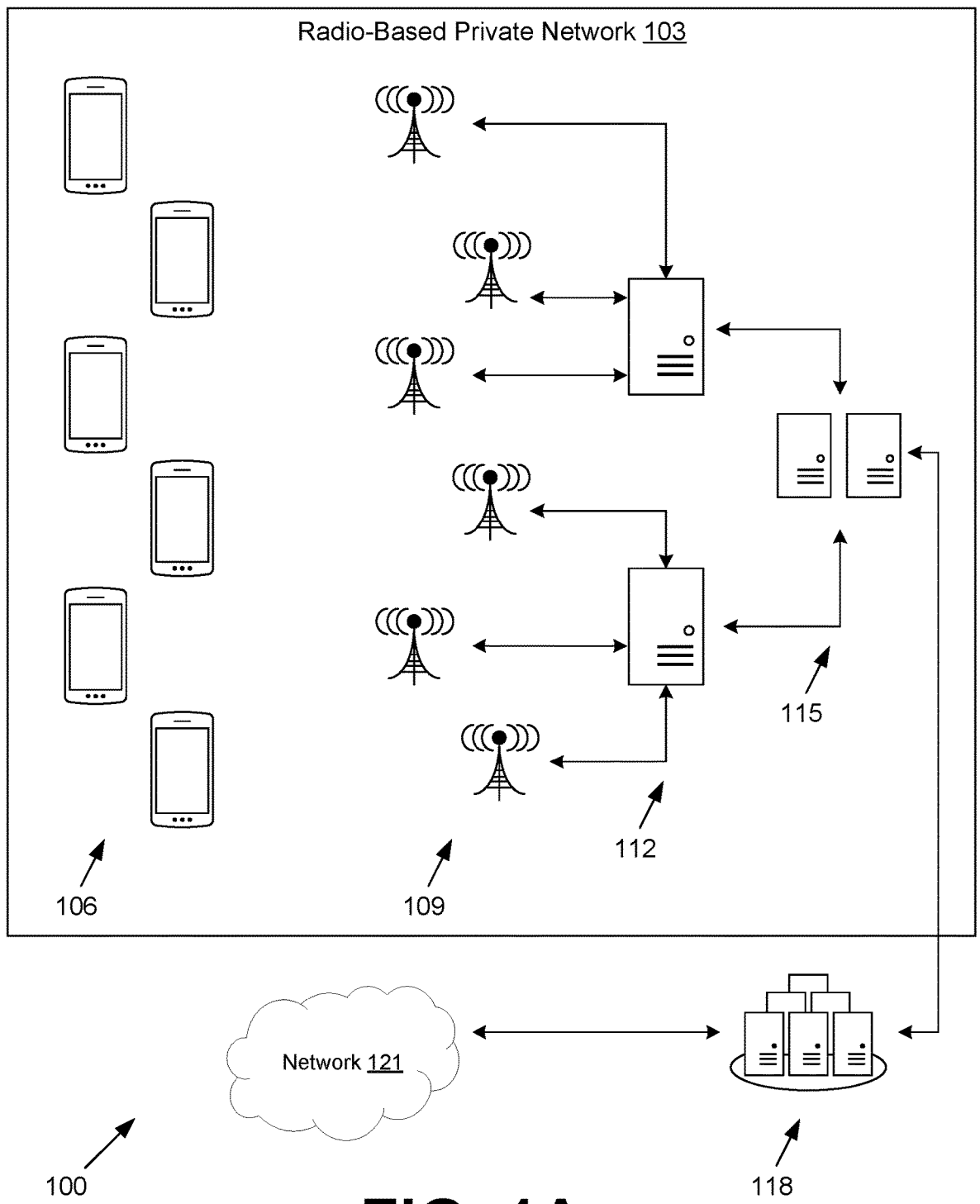
FIG. 1A is a drawing of an example of a communication network that deployed and managed according to various embodiments of the present disclosure.

The present disclosure relates to interfaces that facilitate the automated deployment and modification of radio-based private networks, such as 4G and 5G radio access networks, or portions of such radio-based networks, and associated core networks using cloud provider network infrastructure. Such interfaces may include user interfaces and/or application programming interfaces (APIs). Previous deployments of radio-based networks have relied upon manual deployment and configuration at each step of the process. This proved to be extremely time consuming and expensive. Further, in previous generations, software was inherently tied to vendor-specific hardware, thereby preventing customers from deploying alternative software. By contrast, with 5G, hardware is decoupled from the software stack, which allows more flexibility, and allows components of the radio-based network to be executed on cloud provider infrastructure. Using a cloud delivery model for a radio-based network, such as a 5G network, can facilitate handling network traffic from hundreds up to billions of connected devices and compute-intensive applications, while delivering faster speeds, lower latency, and more capacity than other types of networks.

Historically, enterprises have had to choose between performance and price when evaluating their enterprise connectivity solutions. Cellular networks may offer high performance, great indoor and outdoor coverage, and advanced Quality of Service (QoS) connectivity features, but private cellular networks can be expensive and complex to manage. While Ethernet and Wi-Fi require less upfront investment and are easier to manage, enterprises often find that they can be less reliable, require a lot of work to get the best coverage, and do not offer QoS features such as guaranteed bit rate, latency, and reliability.

The disclosed private radio-based network service can give enterprises the best of both worlds—the performance, coverage, and QoS of a Telco-grade cellular network, with ease and cost of deployment and operation associated with Wi-Fi. The disclosed service can provide suitable hardware in different form factors that enterprises can deploy to their sites, and comes integrated with software that runs the entire network, from small cell sites to the internet break-outs. Enterprises can freely deploy various 5G devices and sensors across the enterprise—factory floors, warehouses, lobbies, and communications centers—and manage these devices, enroll users, and assign QoS from a management console. With the disclosed technology, customers can assign constant bit rate throughput to all their devices (such as cameras, sensors, or IoT devices), reliable low latency connection to devices running on factory floors, and broadband connectivity to all handheld devices. The disclosed service can manage all the software needed to deliver connectivity that meets the specified constraints and requirements. This enables an entirely new set of applications that have strict QoS or high IoT device density requirements that traditionally have not been able to run on Wi-Fi networks.

The disclosed service supports multiple deployment scenarios. In a cloud only deployment, the service can provide small radio cells that an enterprise customer can place on site, while the network functions and other network software are run in the closest (or one of several closest) cloud provider availability zones or edge locations. For enterprises that want an on-premise deployment, the disclosed service provides cloud-provider hardware such as the substrate extensions described herein. In this mode, the network and applications remain on premises for the enterprise, enabling the enterprise to securely store and process data that needs to remain local (e.g., for regulatory compliance, security concerns, etc.). Further, the disclosed service can allow any compute and storage that is not being used for running the radio-based network to be used to run any local workloads via the same APIs that customers can use to run workloads in traditional cloud provider regions. Beneficially, because of this enterprises do not have to worry about being over-scaled and wasting capacity, because the service will enable any excess capacity to be used for local processing and will provision new hardware and software as the needs of the network change. Further, the disclosed service can provide application development APIs that expose and manage 5G capabilities like QoS, enabling customers to build applications that can fully utilize the latency and bandwidth capabilities of their network without having to understand the details of the network.

Additionally, the disclosed service can provide a private zone to run local applications within a cloud provider network. This private zone can be connected to and effectively part of a broader regional zone, and allows the customer to manage the private zone using the same APIs and tools as used in the cloud provider network. Like an availability zone, the private zone can be assigned a virtual private network subnet. An API can be used to create and assign subnets to all zones that the customer wishes to use, including the private zone and existing other zones. A management console may offer a simplified process for creating a private zone. Virtual machine instances and containers can be launched in the private zone just as in regional zones. Customer can configure a network gateway to define routes, assign IP addresses, set up network address translation (NAT), and so forth. Automatic scaling can be used to scale the capacity of virtual machine instances or containers as needed in the private zone. The same management and authentication APIs of the cloud provider network can be used within the private zone. In some cases, since cloud services available in the regional zone can be accessed remotely from private zones over a secure connection, these cloud services can be accessed without having to upgrade or modify the local deployment.

Various embodiments of the present disclosure introduce approaches that allow customers to order and deploy a radio-based private network and an associated core network in an automated way. The customers may include enterprises and organizations that wish to set up a radio-based network for internal uses (e.g., a private 5G network). Through various user interfaces or APIs, a customer may specify its network plan or requirements (for example, physical site layout and device/application types and quantities), and the various components necessary to implement a radio-based private network for the customer may be automatically determined and provisioned. Hardware, such as antennas, radios, and computer servers, may be preconfigured for the customer's radio-based private network and shipped to the customer. The process of installing the preconfigured hardware is largely plug-and-play, and the radio-based private network can be activated through a user interface or API. In addition to deploying a radio-based private network, such as all or a portion of a new radio access network, various embodiments of the present disclosure may facilitate modification and management of the radio-based private network, including the deployment of preconfigured equipment for additional cells, and the assignment of QoS constraints for particular devices or applications on their radio-based private network.

Various embodiments of the present disclosure may also bring the concept of elasticity and utility computing from the cloud computing model to radio-based private networks and associated core networks. For example, the disclosed techniques can run core and radio access network functions and associated control plane management functions on cloud provider infrastructure, creating a cloud native core network and/or a cloud native radio access network (RAN). Such core and RAN network functions can be based on the 3rd Generation Partnership Project (3GPP) specifications in some implementations. By providing a cloud-native radio-based network, a customer may dynamically scale its radio-based private network based on utilization, latency requirements, and/or other factors. In some cases, the hardware sent to the customer include sufficient capacity to run both programs for operation and management of the radio-based network as well as other workloads of the customer (e.g., their applications), such that any capacity not used for the radio-based network can be accessible to run workloads under a utility computing model. Beneficially, the customer's radio-based network can scale up into this excess capacity as needed, for example, allowing the hardware usage requirements of the radio-based network to increase even before new physical hardware is provisioned to the customer. Customers may also configure thresholds to receive alerts relating to radio-based network usage and excess capacity usage of their provisioned infrastructure, in order to more effectively manage provisioning of new infrastructure or deprovisioning of existing infrastructure based on their dynamic networking and workload requirements.

As one skilled in the art will appreciate in light of this disclosure, certain embodiments may be capable of achieving certain advantages, including some or all of the following: (1) improving the user experience by allowing organizations to deploy their own radio-based private networks in a largely automated, plug-and-play way; (2) improving flexibility in computer systems by allowing computing hardware previously dedicated to network functions in radio-based networks and associated core networks to be repurposed for other applications; (3) improving flexibility in computer systems by allowing computing hardware previously dedicated to a first radio-based private network to be repurposed automatically for a second radio-based private network (or to be repurposed between RAN and core network functions of the same radio-based network on an as-needed basis); (4) improving the user experience in deploying a radio-based private network by preconfiguring antennas, radios, and other hardware, thereby providing a plug-and-play installation experience; (5) improving the performance of radio-based private networks by optimizing deployment of cells and spectrum utilization; (6) improving the performance and management of radio-based networks by monitoring performance metrics and adding, removing, and reconfiguring cells as needed to maintain acceptable performance; (7) improving the scalability and overall performance of a radio-based private network by transferring network functions previously provided by proprietary hardware to virtual machine instances operated by a cloud computing provider with elasticity under a utility computing model; (8) reducing latency in a radio-based private network by transferring network functions to virtual machine instances executed on computing devices of a cloud service provider at a cell site; (9) improving security of the radio-based private network by configuring network function workloads to remain on a customer's premises; and so forth.

Among the benefits of the present disclosure is the ability to deploy and chain network functions together to deliver an end-to-end service that meets specified constraints and requirements. According to the present disclosure, network functions organized into microservices work together to provide end-to-end connectivity. One set of network functions are part of a radio network, running in cell towers and performing wireless signal to IP conversion. Other network functions run in large data centers performing subscriber related business logic and routing IP traffic to the internet and back. For applications to use the new capabilities of 5G such as low latency communication and reserved bandwidth, both of these types of network functions need to work together to appropriately schedule and reserve wireless spectrum, and perform real time compute and data processing. The presently disclosed techniques provide edge location hardware (as described further below) integrated with network functions that run across the entire network, from cell sites to Internet break-outs, and orchestrates the network functions to meet required Quality of Service (QoS) constraints. This enables an entirely new set of applications that have strict QoS requirements, from factory-based Internet of Things (IoT), to augmented reality (AR), to virtual reality (VR), to game streaming, to autonomous navigation support for connected vehicles, that previously could not run on a mobile network.

The described "elastic 5G" service provides and manages all the hardware, software, and network functions required to build a network. In some embodiments, the network functions may be developed and managed by the cloud service provider; however, the described control plane can manage network functions across a range of providers so that customers can use a single set of APIs to call and manage their choice of network functions on cloud infrastructure. The elastic 5G service beneficially automates the creation of an end-to-end 5G network, from hardware to network functions thus reducing the time to deploy and the operational cost of operating the network. By providing APIs that expose network capabilities, the disclosed elastic 5G service enables applications to simply specify the desired QoS as constraints and then deploys and chains the network functions together to deliver an end-to-end service that meets the specified requirements, thus making it possible to easily build new applications.

The present disclosure describes embodiments relating to the creation and management of a cloud native 5G core and/or a cloud native 5G RAN, and associated control plane components. Cloud native refers to an approach to building and running applications that exploits the advantages of the cloud computing delivery model such as dynamic scalability, distributed computing, and high availability (including geographic distribution, redundancy, and failover). Cloud native refers to how these applications are created and deployed to be suitable for deployment in a public cloud. While cloud native applications can be (and often are) run in the public cloud, they also can be run in an on-premises data center. Some cloud native applications can be containerized, for example, having different parts, functions, or subunits of the application packaged in their own containers, which can be dynamically orchestrated so that each part is actively scheduled and managed to optimize resource utilization. These containerized applications can be architected using a microservices architecture to increase the overall agility and maintainability of the applications.

In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environment from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed core and RAN software may follow a microservices architecture such that the described radio-based networks are composed of independent subunits that can be deployed and scaled on demand.

Turning now to FIG. 1A, shown is an example of a communication network 100 that deployed and managed according to various embodiments of the present disclosure. The communication network 100 includes a radio-based private network 103, which may correspond to a cellular network such as a fourth-generation (4G) Long-Term Evolution (LTE) network, a fifth-generation (5G) network, a 4G-5G hybrid core with both 4G and 5G RANs, or another network that provides wireless network access. The radio-based private network 103 may be operated by a cloud service provider for an enterprise, a non-profit, a school system, a governmental entity or other organization. Although referred to as a private network, the radio-based private network 103 may use private network addresses or public network addresses in various embodiments.

Various deployments of radio-based private network 103 can include one or more of a core network and a RAN network, as well as a control plane for running the core and/or RAN network on cloud provider infrastructure. As described above, these components can be developed in a cloud native fashion, for example using a microservices architecture, such that centralized control and distributed processing is used to scale traffic and transactions efficiently. These components may be based on the 3GPP specifications by following an application architecture in which control plane and user plane processing is separated (CUPS Architecture).

The radio-based private network 103 provides wireless network access to a plurality of wireless devices 106, which may be mobile devices or fixed location devices. In various examples, the wireless devices 106 may include smartphones, connected vehicles, IoT devices, sensors, machinery (such as in a manufacturing facility), hotspots, and other devices. The wireless devices 106 are sometimes referred to as user equipment (UE) or customer premises equipment (CPE).

The radio-based private network 103 can include a radio access network (RAN) that provides the wireless network access to the plurality of wireless devices 106 through a plurality of cells 109. Each of the cells 109 may be equipped with one or more antennas and one or more radio units that send and receive wireless data signals to and from the wireless devices 106. The antennas may be configured for one or more frequency bands, and the radio units may also be frequency agile or frequency adjustable. The antennas may be associated with a certain gain or beamwidth in order to focus a signal in a particular direction or azimuthal range, potentially allowing reuse of frequencies in a different direction. Further, the antennas may be horizontally, vertically, or circularly polarized. In some examples, a radio unit may utilize multiple-input, multiple-output (MIMO) technology to send and receive signals. As such, the RAN implements a radio access technology to enable radio connection with wireless devices 106, and provides connection with the radio-based private network's core network. Components of the RAN include a base station and antennas that cover a given physical area, as well as required core network items for managing connections to the RAN.

Data traffic is often routed through a fiber transport network consisting of multiple hops of layer 3 routers (e.g., at aggregation sites) to the core network. The core network is typically housed in one or more data centers. The core network typically aggregates data traffic from end devices, authenticates subscribers and devices, applies personalized policies, and manages the mobility of the devices before routing the traffic to operator services or the Internet. A 5G Core for example can be decomposed into a number of microservice elements with control and user plane separation. Rather than physical network elements, a 5G Core can comprise virtualized, software-based network functions (deployed for example as microservices) and can therefore be instantiated within Multi-access Edge Computing (MEC) cloud infrastructures. The network functions of the core network can include a User Plane Function (UPF), Access and Mobility Management Function (AMF), and Session Management Function (SMF), described in more detail below. For data traffic destined for locations outside of the communication network 100, network functions typically include a firewall through which traffic can enter or leave the communication network 100 to external networks such as the Internet or a cloud provider network. Note that in some embodiments, the communication network 100 can include facilities to permit traffic to enter or leave from sites further downstream from the core network (e.g., at an aggregation site or radio-based private network 103).

The UPF provides an interconnect point between the mobile infrastructure and the Data Network (DN), i.e., encapsulation and decapsulation of General Packet Radio Service (GPRS) tunneling protocol for the user plane (GTP-U). The UPF can also provide a session anchor point for providing mobility within the RAN, including sending one or more end marker packets to the RAN base stations. The UPF can also handle packet routing and forwarding, including directing flows to specific data networks based on traffic matching filters. Another feature of the UPF includes per-flow or per-application QoS handling, including transport level packet marking for uplink (UL) and downlink (DL), and rate limiting. The UPF can be implemented as a cloud native network function using modern microservices methodologies, for example being deployable within a serverless framework (which abstracts away the underlying infrastructure that code runs on via a managed service).

The AMF can receive the connection and session information from the wireless devices 106 or the RAN and can handle connection and mobility management tasks. For example, the AMF can manage handovers between base stations in the RAN. In some examples the AMF can be considered as the access point to the 5G core, by terminating certain RAN control plane and wireless device 106 traffic. The AMF can also implement ciphering and integrity protection algorithms.

The SMF can handle session establishment or modification, for example by creating, updating, and removing Protocol Data Unit (PDU) sessions and managing session context within the UPF. The SMF can also implement Dynamic Host Configuration Protocol (DHCP) and IP Address Management (IPAM). The SMF can be implemented as a cloud native network function using modern microservices methodologies.

Various network functions to implement the radio-based private network 103 may be deployed in distributed computing devices 112, which may correspond to general-purpose computing devices configured to perform the network functions. For example, the distributed computing devices 112 may execute one or more virtual machine instances that are configured in turn to execute one or more services that perform the network functions. In one embodiment, the distributed computing devices 112 are ruggedized machines that are deployed at each cell site.

By contrast, one or more centralized computing devices 115 may perform various network functions at a central site operated by the customer. For example, the centralized computing devices 115 may be centrally located on premises of the customer in a conditioned server room. The centralized computing devices 115 may execute one or more virtual machine instances that are configured in turn to execute one or more services that perform the network functions.

In one or more embodiments, network traffic from the radio-based private network 103 is backhauled to one or more computing devices on a core network 118 that may be located at one or more data centers situated remotely from the customer's site. The core network 118 may also perform various network functions, including routing network traffic to and from the network 121, which may correspond to the Internet and/or other external public or private networks. The core network 118 may perform functionality related to the management of the communication network 100 (e.g., billing, mobility management, etc.) and transport functionality to relay traffic between the communication network 100 and other networks.

Figure 1B:
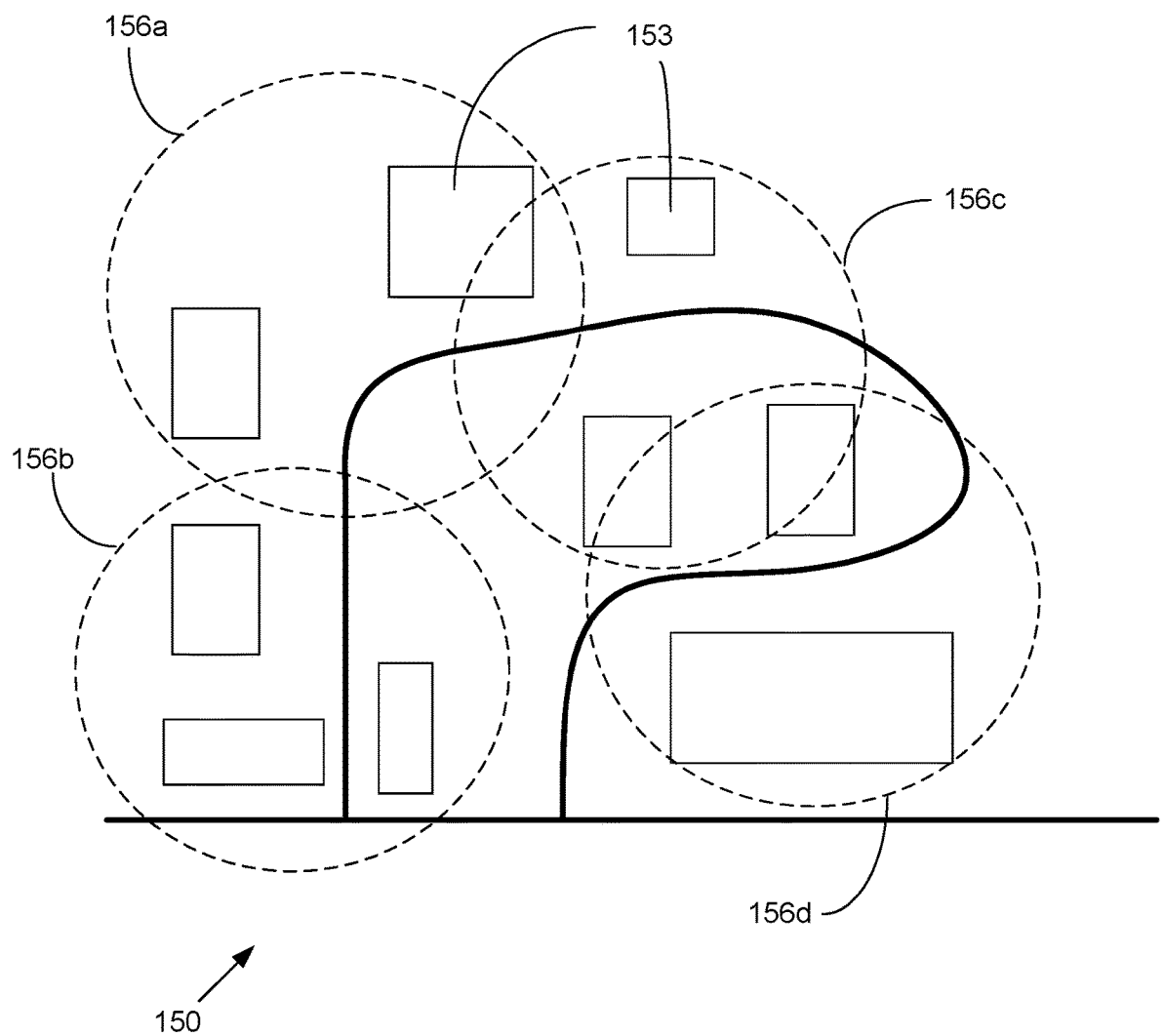
FIG. 1B is an example of a radio-based private network used on an organizational campus with a plurality of buildings and deployed in accordance with various embodiments of the present disclosure.

Moving on to FIG. 1B, shown is an example of a radio-based private network 150 used on an organizational campus (such as the premises of an enterprise such as a business, school, or other organization) with a plurality of buildings 153 and deployed in accordance with various embodiments of the present disclosure. Although FIG. 1B depicts an example with multiple buildings, it will be appreciated that the disclosed techniques can similarly be applied to any layout of a site, which may include one or more buildings and/or one or more outdoor spaces (such as stadiums or other outdoor venues).

The radio-based private network 150 in this non-limiting example includes four cells 156a, 156b, 156c, and 156d to fully cover the organizational campus. The cells 156 may overlap somewhat in order to provide exhaustive coverage within each of the buildings 153. The adjacent or overlapping cells 156 are configured to operate with non-interfering frequencies. For example, cell 156a may use Frequency A, cell 156b may use Frequency B, and cell 156c may use Frequency C, which are all distinct frequencies as the coverage of the respective cells 156a, 156b, and 156c overlap. However, cell 156d may use, for example, Frequency A or B as the coverage of cell 156d does not overlap cell 156a or 156b.

It is noted that depending on usage or other network metrics, cells 156 may be added or removed from the radio-based private network 150. In some cases, signal strength to cells 156 may be increased to reduce the number of cells 156, or lowered to increase the number of cells 156 while allowing for spectrum reuse among the cells 156. Additionally, computing capacity may be added within the geographic area of the organizational campus or within a cloud provider network in order to decrease latency, maintain security, and increase reliability, for the radio-based private network 150 as desired. In some cases, computing capacity for software that implements the radio-based private network 150 may be provisioned mostly or wholly in a cloud provider network and not on a customer's premises, such as in a regional data center of a cloud service provider. This software may implement various network functions such as the UPF, AMF, SMF, and so forth, that may correspond to the core network functions, central unit network functions, and distributed unit network functions. Some network functions, such as distributed unit network functions, may remain at the cell site.

Figure 2A:
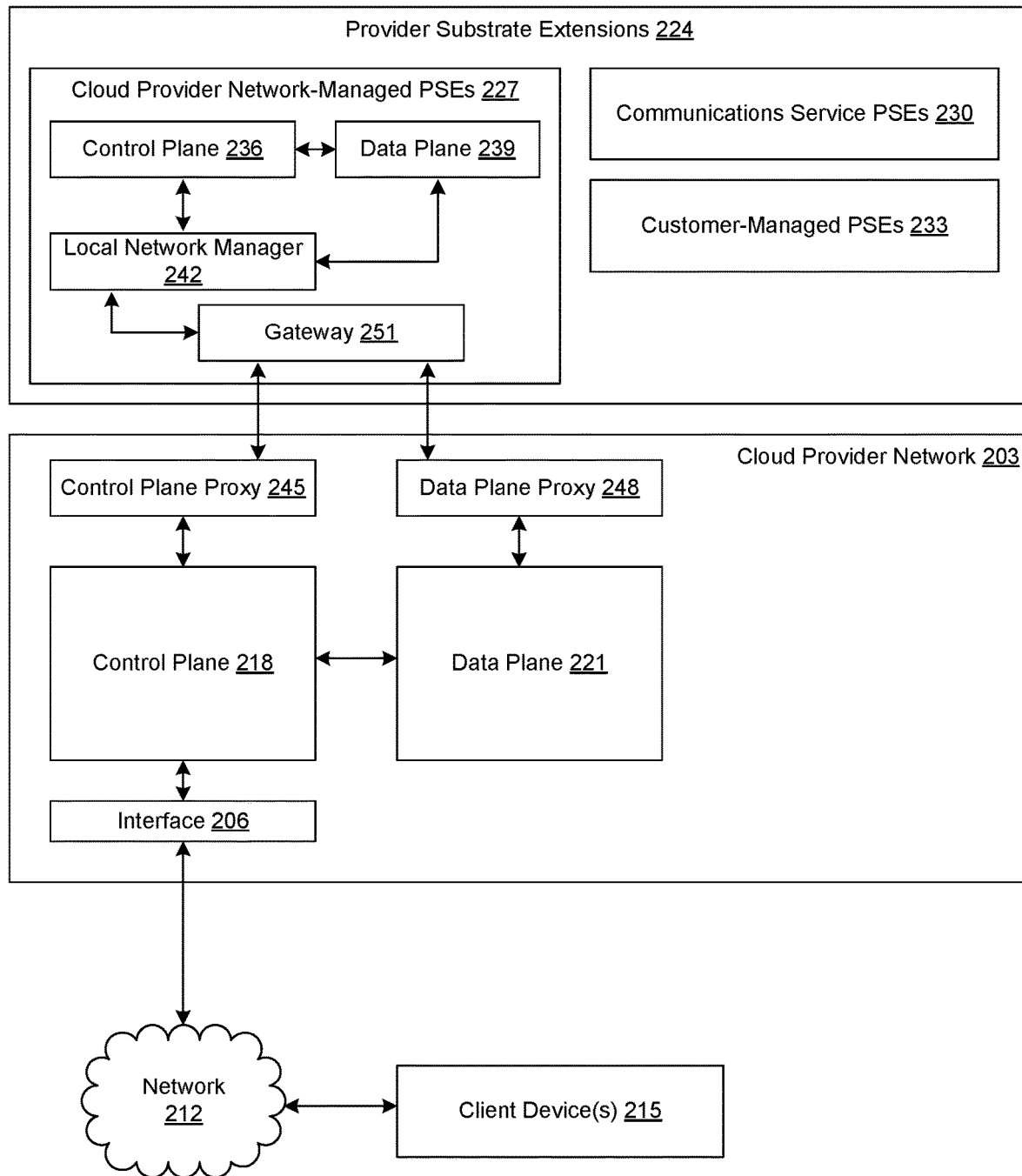
FIG. 2A illustrates an example of a networked environment including a cloud provider network and further including various provider substrate extensions of the cloud provider network, which may be used in various locations within the communication network of FIG. 1A, according to some embodiments of the present disclosure.

FIG. 2A illustrates an example of a networked environment 200 including a cloud provider network 203 and further including various provider substrate extensions of the cloud provider network, which may be used in combination with on-premise customer deployments within the communication network 100 of FIG. 1, according to some embodiments. A cloud provider network 203 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 203 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 203 resources and services, and configure and manage telecommunications networks such as 5G networks, using various interfaces 206 (e.g., APIs) via intermediate network(s) 212. An API refers to an interface and/or communication protocol between a client device 215 and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 203 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 203, for example it may not be possible to route from a substrate network address to an address in a production network that runs services of the cloud provider, or to a customer network that hosts customer resources.

The cloud provider network 203 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 203. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 203 for routing packets between endpoints.

As illustrated, the traffic and operations of the cloud provider network substrate may broadly be subdivided into two categories in various embodiments: control plane traffic carried over a logical control plane 218 and data plane operations carried over a logical data plane 221. While the data plane 221 represents the movement of user data through the distributed computing system, the control plane 218 represents the movement of control signals through the distributed computing system. The control plane 218 generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 221 includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 203 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 221 can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or "hardware virtualization service") of the cloud provider network. The virtualized computing service may be part of the control plane 218, allowing customers to issue commands via an interface 206 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 221 can also include one or more block store servers, which can include persistent storage for storing volumes of customer data as well as software for managing these volumes. These block store servers can support a managed block storage service of the cloud provider network. The managed block storage service may be part of the control plane 218, allowing customers to issue commands via the interface 206 (e.g., an API) to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 221 can also include one or more object store servers, which represent another type of storage within the cloud provider network. The object storage servers include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 224 ("PSE") provides resources and services of the cloud provider network 203 within a separate network, such as a telecommunications network, thereby extending functionality of the cloud provider network 203 to new locations (e.g., for reasons related to latency in communications with customer devices, legal compliance, security, etc.). In some implementations, a PSE 224 can be configured to provide capacity for cloud-based workloads to run within the telecommunications network. In some implementations, a PSE 224 can be configured to provide the core and/or RAN functions of the telecommunications network, and may be configured with additional hardware (e.g., radio access hardware). Some implementations may be configured to allow for both, for example by allowing capacity unused by core and/or RAN functions to be used for running cloud-based workloads.

As indicated, such provider substrate extensions 224 can include cloud provider network-managed provider substrate extensions 227 (e.g., formed by servers located in a cloud provider-managed facility separate from those associated with the cloud provider network 203), communications service provider substrate extensions 230 (e.g., formed by servers associated with communications service provider facilities), customer-managed provider substrate extensions 233 (e.g., formed by servers located on-premise in a customer or partner facility), among other possible types of substrate extensions.

As illustrated in the example provider substrate extension 224, a provider substrate extension 224 can similarly include a logical separation between a control plane 236 and a data plane 239, respectively extending the control plane 218 and data plane 221 of the cloud provider network 203. The provider substrate extension 224 may be preconfigured, e.g., by the cloud provider network operator, with an appropriate combination of hardware with software and/or firmware elements to support various types of computing-related resources, and to do so in a manner that mirrors the experience of using the cloud provider network. For example, one or more provider substrate extension location servers can be provisioned by the cloud provider for deployment within a provider substrate extension 224. As described above, the cloud provider network 203 may offer a set of predefined instance types, each having varying types and quantities of underlying hardware resources. Each instance type may also be offered in various sizes. In order to enable customers to continue using the same instance types and sizes in a provider substrate extension 224 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 203 and the cloud provider network-managed provider substrate extension 227.

The provider substrate extension servers can host one or more compute instances. Compute instances can be VMs, or containers that package up code and all its dependencies so an application can run quickly and reliably across computing environments (e.g., including VMs and microVMs). In addition, the servers may host one or more data volumes, if desired by the customer. In the region of a cloud provider network 203, such volumes may be hosted on dedicated block store servers. However, due to the possibility of having a significantly smaller capacity at a provider substrate extension 224 than in the region, an optimal utilization experience may not be provided if the provider substrate extension 224 includes such dedicated block store servers. Accordingly, a block storage service may be virtualized in the provider substrate extension 224, such that one of the VMs runs the block store software and stores the data of a volume. Similar to the operation of a block storage service in the region of a cloud provider network 203, the volumes within a provider substrate extension 224 may be replicated for durability and availability. The volumes may be provisioned within their own isolated virtual network within the provider substrate extension 224. The compute instances and any volumes collectively make up a data plane 239 extension of the provider network data plane 221 within the provider substrate extension 224.

The servers within a provider substrate extension 224 may, in some implementations, host certain local control plane components, for example, components that enable the provider substrate extension 224 to continue functioning if there is a break in the connection back to the cloud provider network 203. Examples of these components include a migration manager that can move compute instances between provider substrate extension servers if needed to maintain availability, and a key value data store that indicates where volume replicas are located. However, generally the control plane 236 functionality for a provider substrate extension will remain in the cloud provider network 203 in order to allow customers to use as much resource capacity of the provider substrate extension as possible.

The migration manager may have a centralized coordination component that runs in the region, as well as local controllers that run on the PSE servers (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at a provider substrate extension 224 may be designed by the cloud provider to run on the cloud provider substrate network, and this software may be enabled to run unmodified in a provider substrate extension 224 by using local network manager(s) 242 to create a private replica of the substrate network within the edge location (a "shadow substrate"). The local network manager(s) 242 can run on provider substrate extension 224 servers and bridge the shadow substrate with the provider substrate extension 224 network, for example, by acting as a virtual private network (VPN) endpoint or endpoints between the provider substrate extension 224 and the proxies 245, 248 in the cloud provider network 203 and by implementing the mapping service (for traffic encapsulation and decapsulation) to relate data plane traffic (from the data plane proxies 248) and control plane traffic (from the control plane proxies 245) to the appropriate server(s). By implementing a local version of the provider network's substrate-overlay mapping service, the local network manager(s) 242 allow resources in the provider substrate extension 224 to seamlessly communicate with resources in the cloud provider network 203. In some implementations, a single local network manager 242 can perform these actions for all servers hosting compute instances in a provider substrate extension 224. In other implementations, each of the server hosting compute instances may have a dedicated local network manager 242. In multi-rack edge locations, inter-rack communications can go through the local network managers 242, with local network managers maintaining open tunnels to one another.

Provider substrate extension locations can utilize secure networking tunnels through the provider substrate extension 224 network to the cloud provider network 203, for example, to maintain security of customer data when traversing the provider substrate extension 224 network and any other intermediate network (which may include the public internet). Within the cloud provider network 203, these tunnels are composed of virtual infrastructure components including isolated virtual networks (e.g., in the overlay network), control plane proxies 245, data plane proxies 248, and substrate network interfaces. Such proxies 245, 248 may be implemented as containers running on compute instances. In some embodiments, each server in a provider substrate extension 224 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network 203 manages the cloud provider network-side lifecycle of these tunnels and their components, for example, by provisioning them automatically when needed and maintaining them in a healthy operating state. In some embodiments, a direct connection between a provider substrate extension 224 location and the cloud provider network 203 can be used for control and data plane communications. As compared to a VPN through other networks, the direct connection can provide constant bandwidth and more consistent network performance because of its relatively fixed and stable network path.

A control plane (CP) proxy 245 can be provisioned in the cloud provider network 203 to represent particular host(s) in an edge location. CP proxies 245 are intermediaries between the control plane 218 in the cloud provider network 203 and control plane targets in the control plane 236 of provider substrate extension 224. That is, CP proxies 245 provide infrastructure for tunneling management API traffic destined for provider substrate extension servers out of the region substrate and to the provider substrate extension 224. For example, a virtualized computing service of the cloud provider network 203 can issue a command to a VMM of a server of a provider substrate extension 224 to launch a compute instance. A CP proxy 245 maintains a tunnel (e.g., a VPN) to a local network manager 242 of the provider substrate extension. The software implemented within the CP proxies 245 ensures that only well-formed API traffic leaves from and returns to the substrate. CP proxies 245 provide a mechanism to expose remote servers on the cloud provider substrate while still protecting substrate security materials (e.g., encryption keys, security tokens) from leaving the cloud provider network 203. The one-way control plane traffic tunnel imposed by the CP proxies 245 also prevents any (potentially compromised) devices from making calls back to the substrate. CP proxies 245 may be instantiated one-for-one with servers at a provider substrate extension 224 or may be able to manage control plane traffic for multiple servers in the same provider substrate extension.

A data plane (DP) proxy 248 can also be provisioned in the cloud provider network 203 to represent particular server(s) in a provider substrate extension 224. The DP proxy 248 acts as a shadow or anchor of the server(s) and can be used by services within the cloud provider network 203 to monitor the health of the host (including its availability, used/free compute and capacity, used/free storage and capacity, and network bandwidth usage/availability). The DP proxy 248 also allows isolated virtual networks to span provider substrate extensions 224 and the cloud provider network 203 by acting as a proxy for server(s) in the cloud provider network 203. Each DP proxy 248 can be implemented as a packet-forwarding compute instance or container. As illustrated, each DP proxy 248 can maintain a VPN tunnel with a local network manager 242 that manages traffic to the server(s) that the DP proxy 248 represents. This tunnel can be used to send data plane traffic between the provider substrate extension server(s) and the cloud provider network 203. Data plane traffic flowing between a provider substrate extension 224 and the cloud provider network 203 can be passed through DP proxies 248 associated with that provider substrate extension 224. For data plane traffic flowing from a provider substrate extension 224 to the cloud provider network 203, DP proxies 248 can receive encapsulated data plane traffic, validate it for correctness, and allow it to enter into the cloud provider network 203. DP proxies 248 can forward encapsulated traffic from the cloud provider network 203 directly to a provider substrate extension 224.

Local network manager(s) 242 can provide secure network connectivity with the proxies 245, 248 established in the cloud provider network 203. After connectivity has been established between the local network manager(s) 242 and the proxies 245, 248, customers may issue commands via the interface 206 to instantiate compute instances (and/or perform other operations using compute instances) using provider substrate extension resources in a manner analogous to the way in which such commands would be issued with respect to compute instances hosted within the cloud provider network 203. From the perspective of the customer, the customer can now seamlessly use local resources within a provider substrate extension (as well as resources located in the cloud provider network 203, if desired). The compute instances set up on a server at a provider substrate extension 224 may communicate both with electronic devices located in the same network, as well as with other resources that are set up in the cloud provider network 203, as desired. A local gateway 251 can be implemented to provide network connectivity between a provider substrate extension 224 and a network associated with the extension (e.g., a communications service provider network in the example of a communications service provider substrate extension 230).

There may be circumstances that necessitate the transfer of data between the object storage service and a provider substrate extension (PSE) 224. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE 224 to minimize the impact of PSE-region latency on the customer's workloads. The object gateway can also temporarily store snapshot data from snapshots of volumes in the PSE 224 and then sync with the object servers in the region when possible. The object gateway can also store machine images that the customer designates for use within the PSE 224 or on the customer's premises. In some implementations, the data within the PSE 224 may be encrypted with a unique key, and the cloud provider can limit keys from being shared from the region to the PSE 224 for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot data and machine image data using the PSE encryption key.

In the manner described above, a PSE 224 forms an edge location, in that it provides the resources and services of the cloud provider network 203 outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A near zone may be connected in various ways to a publicly accessible network such as the Internet, for example directly, via another network, or via a private connection to a region. Although typically a near zone would have more limited capacity than a region, in some cases a near zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only by the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In the example of FIG. 1A, the distributed computing devices 112 (FIG. 1A), the centralized computing devices 115 (FIG. 1A), and the core computing devices 118 (FIG. 1A) may be implemented as provider substrate extensions 224 of the cloud provider network 203. The installation or siting of provider substrate extensions 224 within a communication network 100 can vary subject to the particular network topology or architecture of the communication network 100. Provider substrate extensions 224 can generally be connected anywhere the communication network 100 can break out packet-based traffic (e.g., IP based traffic). Additionally, communications between a given provider substrate extension 224 and the cloud provider network 203 typically securely transit at least a portion of the communication network 100 (e.g., via a secure tunnel, virtual private network, a direct connection, etc.).

In 5G wireless network development efforts, edge locations may be considered a possible implementation of Multi-access Edge Computing (MEC). Such edge locations can be connected to various points within a 5G network that provide a breakout for data traffic as part of the User Plane Function (UPF). Older wireless networks can incorporate edge locations as well. In 3G wireless networks, for example, edge locations can be connected to the packet-switched network portion of a communication network 100, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC). In some embodiments, traffic between a provider substrate extension 224 and the cloud provider network 203 can be broken out of the communication network 100 without routing through the core network.

In some embodiments, provider substrate extensions 224 can be connected to more than one communication network associated with respective customers. For example, when two communication networks of respective customers share or route traffic through a common point, a provider substrate extension 224 can be connected to both networks. For example, each customer can assign some portion of its network address space to the provider substrate extension, and the provider substrate extension can include a router or gateway that can distinguish traffic exchanged with each of the communication networks 100. For example, traffic destined for the provider substrate extension 224 from one network might have a different destination IP address, source IP address, and/or virtual local area network (VLAN) tag than traffic received from another network. Traffic originating from the provider substrate extension to a destination on one of the networks can be similarly encapsulated to have the appropriate VLAN tag, source IP address (e.g., from the pool allocated to the provider substrate extension from the destination network address space) and destination IP address.

Figure 2B:
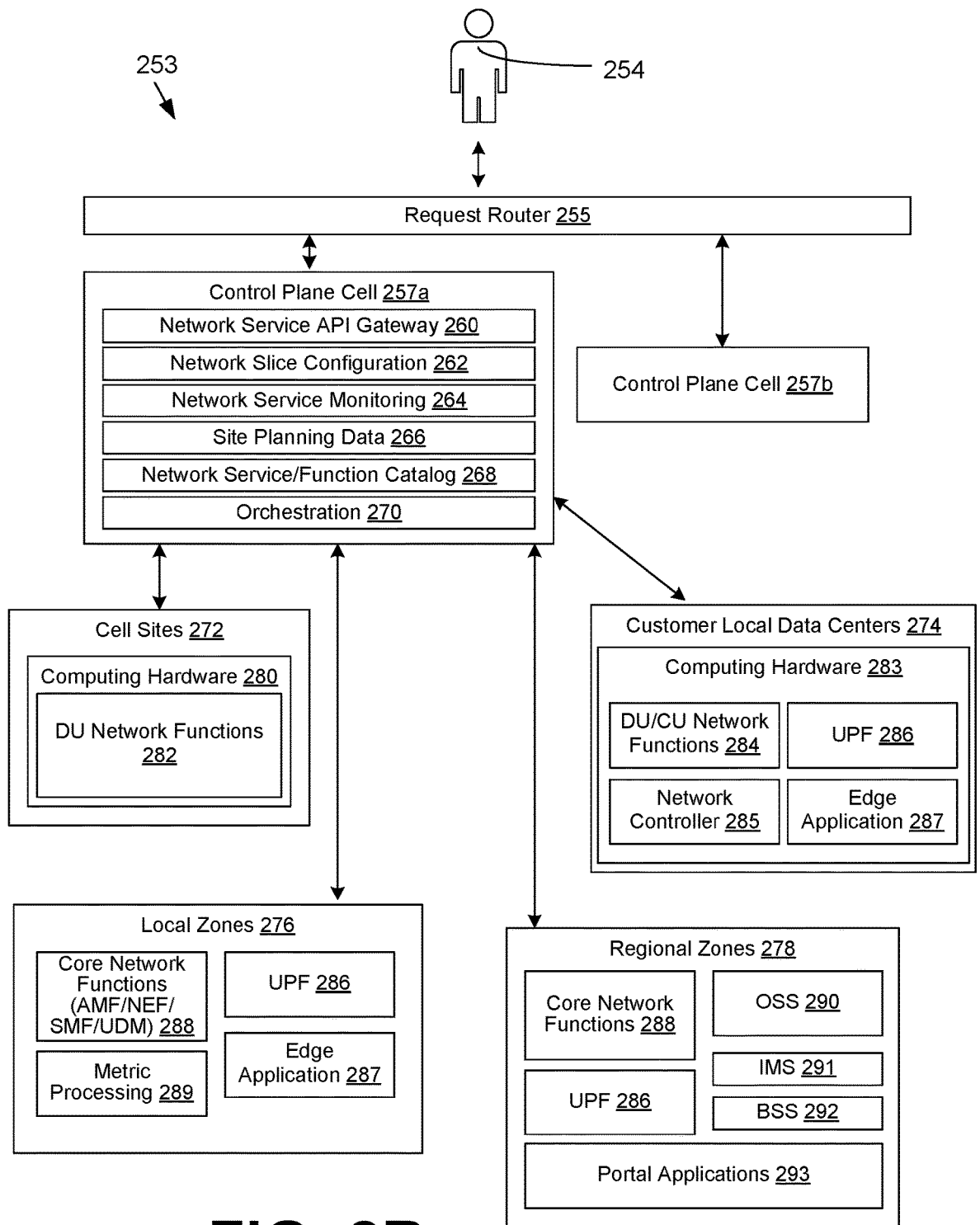
FIG. 2B depicts an example of cellularization and geographic distribution of the communication network of FIG. 1A.

FIG. 2B depicts an example 253 of cellularization and geographic distribution of the communication network 100 (FIG. 1A) for providing highly available user plane functions (UPFs). In FIG. 2B, a user device 254 communicates with a request router 255 to route a request to one of a plurality of control plane cells 257a and 257b. Each control plane cell 257 may include a network service API gateway 260, a network slice configuration 262, a function for network service monitoring 264, site planning data 266 (including layout, device type, device quantities, etc. that describe a customer's site requirements), a network service/function catalog 268, a function for orchestration 270, and/or other components. The larger control plane can be divided into cells in order to reduce the likelihood that large scale errors will affect a wide range of customers, for example by having one or more cells per customer, per network, or per region that operate independently.

The network service/function catalog 268 is also referred to as the NF Repository Function (NRF). In a Service Based Architecture (SBA) 5G network, the control plane functionality and common data repositories can be delivered by way of a set of interconnected network functions built using a microservices architecture. The NRF can maintain a record of available NF instances and their supported services, allowing other NF instances to subscribe and be notified of registrations from NF instances of a given type. The NRF thus can support service discovery by receipt of discovery requests from NF instances, and details which NF instances support specific services. The network function orchestrator 270 can perform NF lifecycle management including instantiation, scale-out/in, performance measurements, event correlation, and termination. The network function orchestrator 270 can also onboard new NFs, manage migration to new or updated versions of existing NFs, identify NF sets that are suitable for a particular network slice or larger network, and orchestrate NFs across different computing devices and sites that make up the radio-based private network 103.

The control plane cell 257 may be in communication with one or more cell sites 272, one or more customer local data centers 274, one or more local zones 276, and one or more regional zones 278. The cell sites 272 include computing hardware 280 that executes one or more distributed unit (DU) network functions 282. The customer local data centers 274 include computing hardware 283 that execute one or more DU or central unit (CU) network functions 284, a network controller 285, a UPF 286, one or more edge applications 287 corresponding to customer workloads, and/or other components.

The local zones 276, which may be in a data center operated by a cloud service provider, may execute one or more core network functions 288, such as an AMF, an SMF, a network exposure function (NEF) that securely exposes the services and capabilities of other network functions, a unified data management (UDM) function that manages subscriber data for authorization, registration, and mobility management. The local zones 276 may also execute a UPF 286, a service for metric processing 289, and one or more edge applications 287.

The regional zones 278, which may be in a data center operated by a cloud service provider, may execute one or more core network functions 288; a UPF 286; an operations support system (OSS) 290 that supports network management systems, service delivery, service fulfillment, service assurance, and customer care; an internet protocol multimedia subsystem (IMS) 291; a business support system (BSS) 292 that supports product management, customer management, revenue management, and/or order management; one or more portal applications 293, and/or other components.

In this example, the communication network 100 employs a cellular architecture to reduce the blast radius of individual components. At the top level, the control plane is in multiple control plane cells 257 to prevent an individual control plane failure from impacting all deployments.

Within each control plane cell 257, multiple redundant stacks can be provided with the control plane shifting traffic to secondary stacks as needed. For example, a cell site 272 may be configured to utilize a nearby local zone 276 as its default core network. In the event that the local zone 276 experiences an outage, the control plane can redirect the cell site 272 to use the backup stack in the regional zone 278. Traffic that would normally be routed from the internet to the local zone 276 can be shifted to endpoints for the regional zones 278. Each control plane cell 257 can implement a "stateless" architecture that shares a common session database across multiple sites (such as across availability zones or edge sites).

Figure 3A:
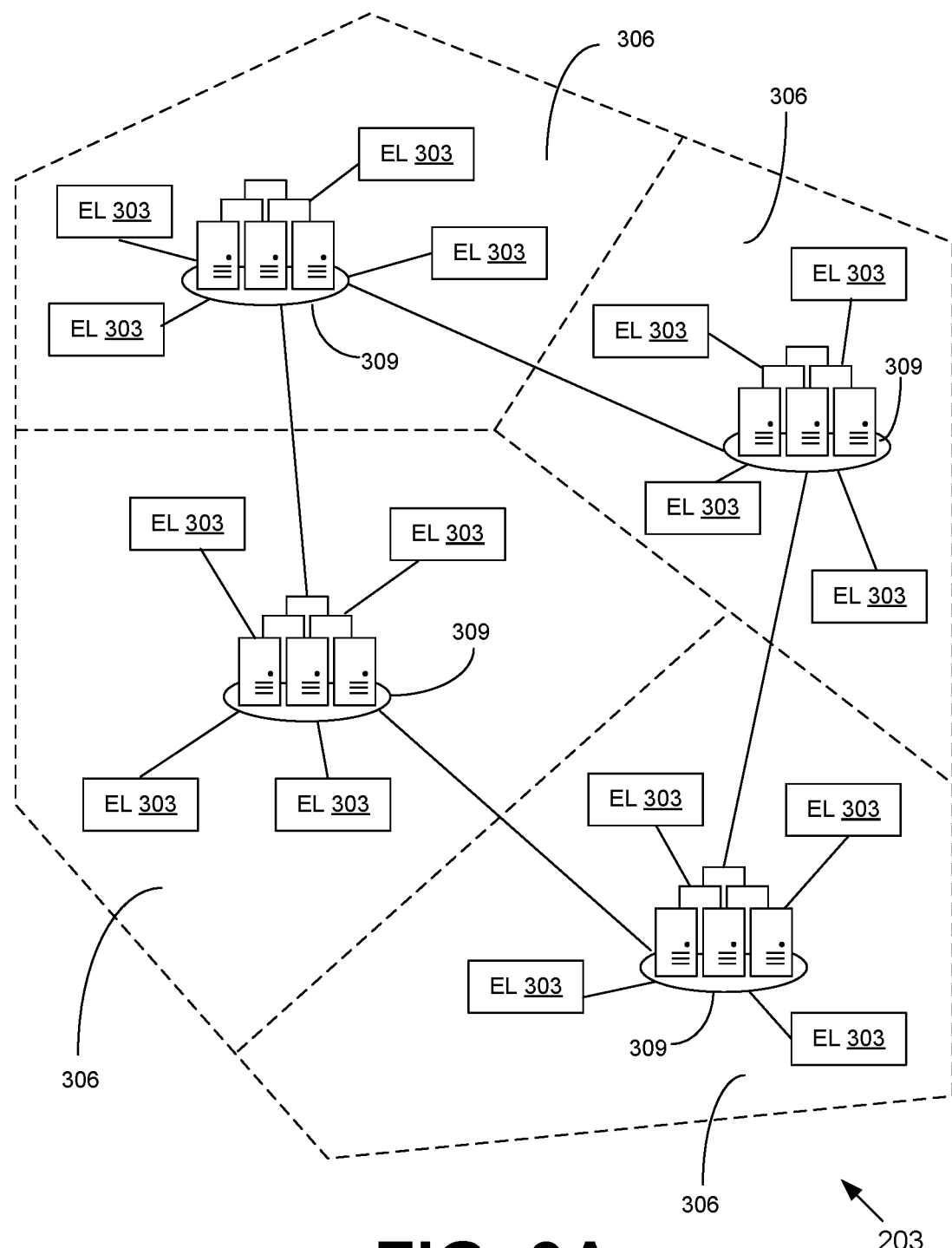
FIG. 3A illustrates an example of the networked environment of FIG. 2A including geographically dispersed provider substrate extensions according to some embodiments of the present disclosure.

FIG. 3A illustrates an exemplary cloud provider network 203 including geographically dispersed provider substrate extensions 224 (FIG. 2A) (or "edge locations 303") according to some embodiments. As illustrated, a cloud provider network 203 can be formed as a number of regions 306, where a region is a separate geographical area in which the cloud provider has one or more data centers 309. Each region 306 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one another such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a communication service provider network). Transit Centers (TC) are the primary backbone locations linking customers to the cloud provider network and may be co-located at other network provider facilities (e.g., Internet service providers, telecommunications providers). Each region can operate two or more TCs for redundancy. Regions 306 are connected to a global network which includes private networking infrastructure (e.g., fiber connections controlled by the cloud service provider) connecting each region 306 to at least one other region. The cloud provider network 203 may deliver content from points of presence (PoPs) outside of, but networked with, these regions 306 by way of edge locations 303 and regional edge cache servers. This compartmentalization and geographic distribution of computing hardware enables the cloud provider network 203 to provide low-latency resource access to customers on a global scale with a high degree of fault tolerance and stability.

In comparison to the number of regional data centers or availability zones, the number of edge locations 303 can be much higher. Such widespread deployment of edge locations 303 can provide low-latency connectivity to the cloud for a much larger group of end user devices (in comparison to those that happen to be very close to a regional data center). In some embodiments, each edge location 303 can be peered to some portion of the cloud provider network 203 (e.g., a parent availability zone or regional data center). Such peering allows the various components operating in the cloud provider network 203 to manage the compute resources of the edge location 303. In some cases, multiple edge locations 303 may be sited or installed in the same facility (e.g., separate racks of computer systems) and managed by different zones or data centers to provide additional redundancy. Note that although edge locations 303 are typically depicted herein as within a communication service provider network or a radio-based private network 103 (FIG. 1A), in some cases, such as when a cloud provider network facility is relatively close to a communications service provider facility, the edge location 303 can remain within the physical premises of the cloud provider network 203 while being connected to the communications service provider network via a fiber or other network link.

An edge location 303 can be structured in several ways. In some implementations, an edge location 303 can be an extension of the cloud provider network substrate including a limited quantity of capacity provided outside of an availability zone (e.g., in a small data center or other facility of the cloud provider that is located close to a customer workload and that may be distant from any availability zones). Such edge locations 303 may be referred to as local zones (due to being more local or proximate to a group of users than traditional availability zones). A local zone may be connected in various ways to a publicly accessible network such as the Internet, for example directly, via another network, or via a private connection to a region 306. Although typically a local zone would have more limited capacity than a region 306, in some cases a local zone may have substantial capacity, for example thousands of racks or more. Some local zones may use similar infrastructure as typical cloud provider data centers, instead of the edge location 303 infrastructure described herein.

As indicated herein, a cloud provider network 203 can be formed as a number of regions 306, where each region 306 represents a geographical area in which the cloud provider clusters data centers. Each region 306 can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region 306 are positioned far enough away from one another such that a same natural disaster (or other failure-inducing event) should not affect or take more than one AZ offline at the same time. Customers can connect to an AZ of the cloud provider network via a publicly accessible network (e.g., the Internet, a cellular communication network).

The parenting of a given edge location 303 to an AZ or region 306 of the cloud provider network 203 can be based on a number of factors. One such parenting factor is data sovereignty. For example, to keep data originating from a communication network in one country within that country, the edge locations 303 deployed within that communication network can be parented to AZs or regions 306 within that country. Another factor is availability of services. For example, some edge locations 303 may have different hardware configurations such as the presence or absence of components such as local non-volatile storage for customer data (e.g., solid state drives), graphics accelerators, etc. Some AZs or regions 306 might lack the services to exploit those additional resources, thus, an edge location could be parented to an AZ or region 306 that supports the use of those resources. Another factor is the latency between the AZ or region 306 and the edge location 303. While the deployment of edge locations 303 within a communication network has latency benefits, those benefits might be negated by parenting an edge location 303 to a distant AZ or region 306 that introduces significant latency for the edge location 303 to region traffic. Accordingly, edge locations 303 are often parented to nearby (in terms of network latency) AZs or regions 306.

Figure 3B:
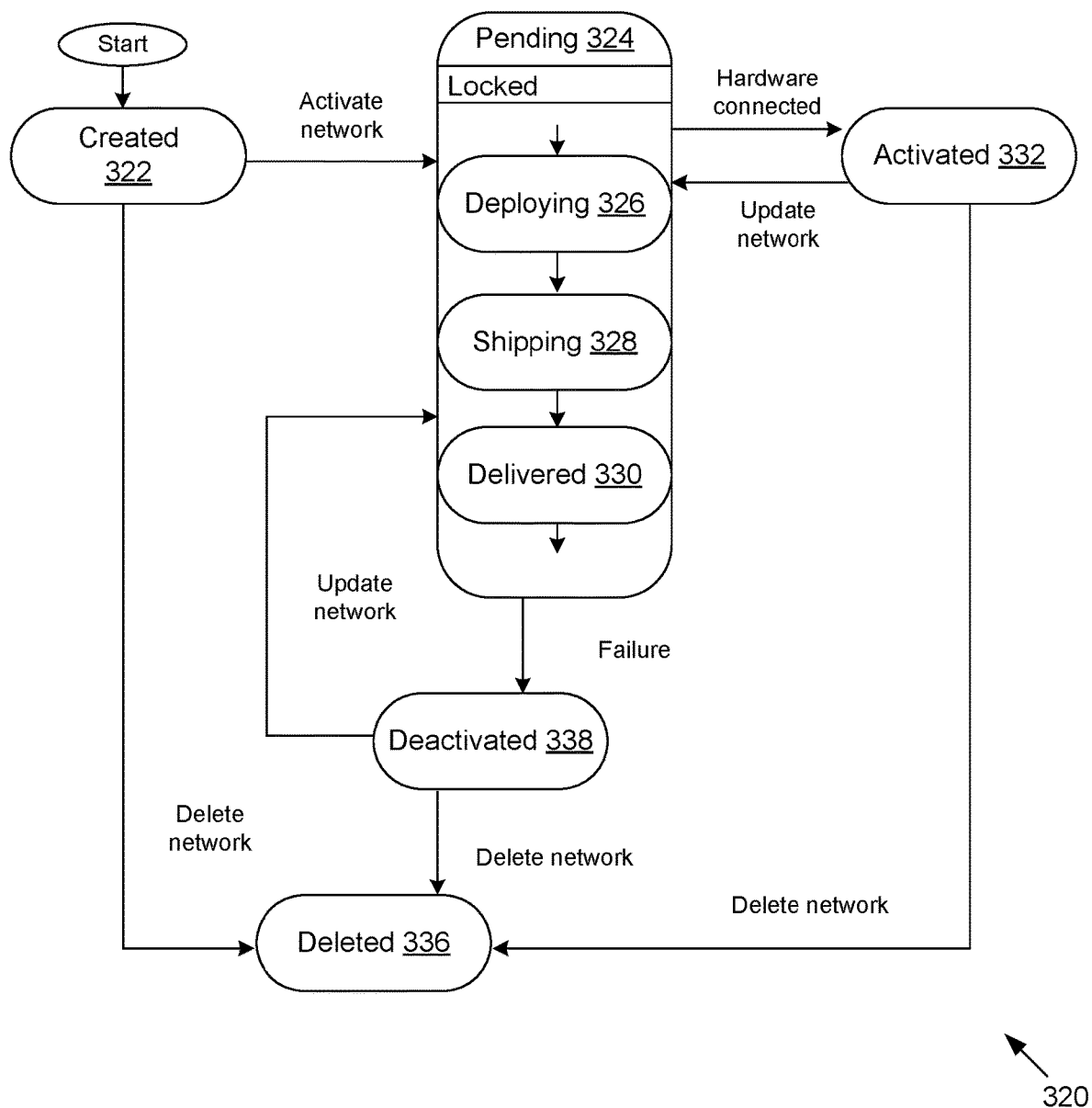
FIG. 3B depicts a state diagram for creation and management of a radio-based private network.

FIG. 3B depicts a state diagram 320 for creation and management of a radio-based private network 103 (FIG. 1A). Beginning with created state 322, a representation of the radio-based private network 103 is created in response to a customer request via a user interface or API call. If the customer then requests to activate the radio-based private network 103, the radio-based private network 103 transitions to the pending state 324. At this point, the radio-based private network 103 is considered locked such that configuration changes to the radio-based private network 103 cannot be made.

Within the pending state 324, the radio-based private network 103 moves to the deploying state 326, where radio units, DU/CU hardware, and in some cases edge computing hardware are ordered and preconfigured for use in the radio-based private network 103. Next, the radio-based private network 103 continues to the shipping state 328 where the preconfigured hardware is shipped to the customer's site. Other hardware such as antennas, tower components, network routers, cabling, and so on, may be shipped to the customer's site as part of the shipment. In some embodiments, subscriber identity modules (SIMs) for the wireless devices 106 (FIG. 1A) may also be shipped. Once the shipment is delivered, the radio-based private network 103 moves to the delivered state 330. Meanwhile, one or more resources for the core network 118 (FIG. 1A) may be provisioned and configured within a cloud provider network 203 (FIG. 2A) to support the radio-based private network 103.

Upon connection of the hardware, the radio-based private network 103 may then move to the activated state 332. In the activated state 332, the radio-based private network 103 is online and available to provide connectivity for wireless devices 106 that have been configured for access to the radio-based private network 103. While in the activated state 332, a customer may request a change to update the radio-based private network 103, such as to request additional or different hardware, thereby causing the radio-based private network 103 to reenter the pending state 324. Alternatively, the customer may request to delete the radio-based private network 103 from the activated state 332, causing the radio-based private network 103 to become deactivated and enter the deleted state 336.

If any of the processes fail in the pending state 324, the radio-based private network 103 may enter the deactivated state 338. From the deactivated state 338, the customer may update the radio-based private network 103 to address the failure, thereby reentering the pending state 324. The customer may instead request that the radio-based private network 103 be deleted, which causes the radio-based private network 103 to enter the deleted state 336. The customer may also cause the radio-based private network 103 to enter the deleted state 336 from the created state 322, if the customer chooses not to activate the radio-based private network 103.

Figure 4:
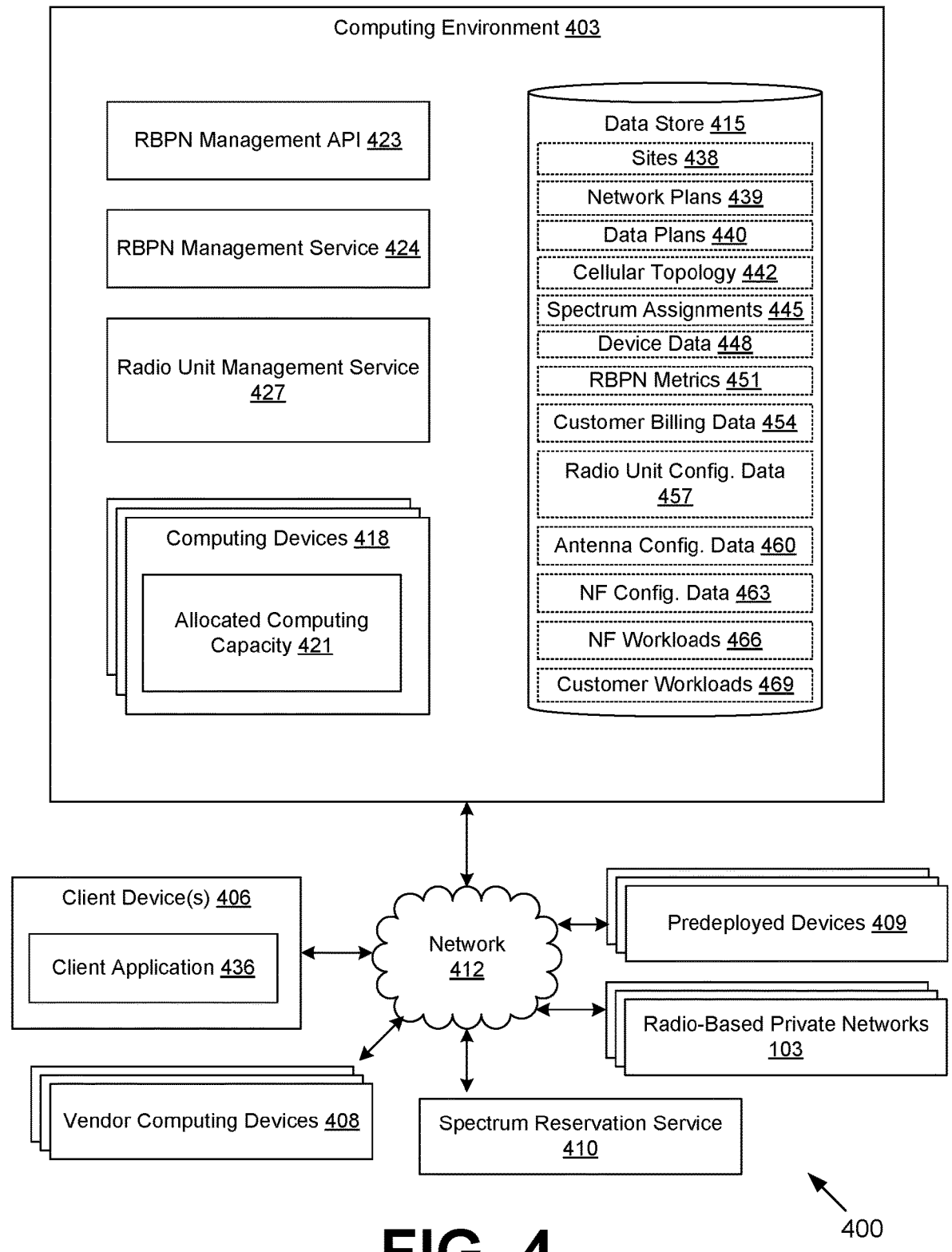
FIG. 4 is a schematic block diagram of the networked environment of FIG. 2A according to various embodiments of the present disclosure.

With reference to FIG. 4, shown is a networked environment 400 according to various embodiments. The networked environment 400 includes a computing environment 403, one or more client devices 406, one or more vendor computing devices 408, one or more predeployed devices 409, a spectrum reservation service 410, and one or more radio-based private networks 103, which are in data communication with each other via a network 412. The network 412 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 403 may comprise, for example, a server computer or any other system providing computing capacity. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource, and/or any other distributed computing arrangement. In some cases, the computing environment 403 may correspond to an elastic computing resource where the allotted capacity of processing, network, storage, or other computing-related resources may vary over time. For example, the computing environment 403 may correspond to a cloud provider network 203 (FIG. 2A), where customers are billed according to their computing resource usage based on a utility computing model.

In some embodiments, the computing environment 403 may correspond to a virtualized private network within a physical network comprising virtual machine instances executed on physical computing hardware, e.g., by way of a hypervisor. The virtual machine instances and any containers running on these instances may be given network connectivity by way of virtualized network components enabled by physical network components, such as routers and switches.

Various applications and/or other functionality may be executed in the computing environment 403 according to various embodiments. Also, various data is stored in a data store 415 that is accessible to the computing environment 403. The data store 415 may be representative of a plurality of data stores 415 as can be appreciated. The data stored in the data store 415, for example, is associated with the operation of the various applications and/or functional entities described below.

The computing environment 403 as part of a cloud provider network offering utility computing services includes computing devices 418 and other types of computing devices. The computing devices 418 may correspond to different types of computing devices 418 and may have different computing architectures. The computing architectures may differ by utilizing processors having different architectures, such as x86, x86_64, ARM, Scalable Processor Architecture (SPARC), PowerPC, and so on. For example, some computing devices 418 may have x86 processors, while other computing devices 418 may have ARM processors. The computing devices 418 may differ also in hardware resources available, such as local storage, graphics processing units (GPUs), machine learning extensions, and other characteristics.

The computing devices 418 may have various forms of allocated computing capacity 421, which may include virtual machine (VM) instances, containers, serverless functions, and so forth. The VM instances may be instantiated from a VM image. To this end, customers may specify that a virtual machine instance should be launched in a particular type of computing devices 418 as opposed to other types of computing devices 418. In various examples, one VM instance may be executed singularly on a particular computing device 418, or a plurality of VM instances may be executed on a particular computing device 418. Also, a particular computing device 418 may execute different types of VM instances, which may offer different quantities of resources available via the computing device 418. For example, some types of VM instances may offer more memory and processing capability than other types of VM instances.

The components executed on the computing environment 403, for example, include a radio-based private network (RBPN) management API 423, a RBPN management service 424, a radio unit management service 427, and other applications, services, processes, systems, engines, or functionality not discussed in detail herein.

The RBPN management API 423 provides interfaces for creating, deploying, activating, managing, updating, deactivating, and deleting radio-based private networks 103. In various embodiments, the RBPN management API 423 may implement functions for creating a site or location, describing a site, deleting a site, updating a site, creating a network plan, describing a network plan, updating a network plan, deleting a network plan, creating a network, describing a network, listing networks associated with a customer, deleting a network, activating a network, creating a data plan, describing a data plan, listing data plans for a network, attaching a SIM or eSIM to a data plan, deleting a data plan, listing SIMs or eSIMs associated with a network, configuring a small cell or radio unit installation either singularly or as a batch, and other functions.

The RBPN management service 424 is executed to manage, configure, and monitor radio-based private networks 103 that are operated by a cloud service provider on behalf of customers. To this end, the RBPN management service 424 may generate a number of user interfaces that allow customers to place orders for new radio-based private networks 103, scale up or scale down existing radio-based private networks 103, modify the operation of existing radio-based private networks 103, configure wireless devices 106 (FIG. 1A) that are permitted to use the radio-based private networks 103, provide statistics and metrics regarding the operation of radio-based private networks 103, reserve frequency spectrum for customer's private networks via a spectrum reservation service 410, and so on. For example, the RBPN management service 424 may generate one or more network pages, such as web pages, that include the user interfaces. Also, the RBPN management service 424 may support this functionality by way of an API that may be called by a client application 436. The RBPN management service 424 may use the RBPN management API 423 to implement the various actions. In addition to facilitating interaction with users, the RBPN management service 424 also implements orchestration of deployments and configuration changes for the radio-based private networks 103 and on-going monitoring of performance parameters. For a particular site 438, the RBPN management service 424 may generate a network plan 439 for a customer based at least in part in a specification of the customer's location in the site 438, an automated site survey by an unmanned aerial vehicle, and/or other input parameters.

The radio unit management service 427 is executed to implement provisioning and configuration changes on hardware that implements a radio-based private network 103. This may include radio units, antennas, VM instances or containers that perform network functions, routers, switches, fiber termination equipment, and so on. For example, antennas may be configured for operation at specific frequencies. Radio units may be programmed to operate at specific frequencies, join a particular radio-based private network 103, and backhaul traffic to a particular VM instance or container.

In some scenarios, the radio unit management service 427 is executed to reconfigure hardware already present in a radio-based private network 103. In other scenarios, the radio unit management service 427 is executed to preconfigure hardware set to be deployed to existing or new radio-based private networks 103. To this end, the radio unit management service 427 may implement configurations on one or more predeployed devices 409 that are temporarily connected to the network 412 to facilitate preconfiguration before the predeployed devices 409 are shipped to the customer for deployment in the radio-based private networks 103.

The RBPN management service 424 may also automate and arrange deployment of hardware to implement a radio-based private network 103. Based on a network plan 439 submitted by or generated for a customer, the RBPN management service 424 may arrange procurement for the hardware components from one or more vendors associated with the vendor computing devices 408 necessary to implement a radio-based private network 103 according to the network plan 439. This may involve placing orders for new equipment automatically from vendors via the vendor computing devices 408, reserving equipment already within inventory of the provider, or reallocating equipment already present at the customer's site or sites of other customers, where the equipment to be reallocated is no longer utilized. In this regard, the RBPN management service 424 may send a directive to customers to return equipment that is no longer utilized, where the equipment may be sent directly to other customers for use in another deployment. In another scenario, the RBPN management service 424 may send a directive to a customer to move a piece of equipment from one site where the equipment is no longer used to another site where the equipment will be used. The RBPN management service 424 may manage connection of equipment to the network 412 for preconfiguration as a predeployed device 409. The RBPN management service 424 may also arrange shipping of equipment to customer locations, including potentially a plurality of locations of the customer corresponding to respective cell sites.

The data stored in the data store 415 includes, for example, one or more sites 438, one or more network plans 439, one or more data plans 440, one or more cellular topologies 442, one or more spectrum assignments 445, device data 448, one or more RBPN metrics 451, customer billing data 454, radio unit configuration data 457, antenna configuration data 460, network function configuration data 463, one or more network function workloads 466, one or more customer workloads 469, and potentially other data.

A site 438 represents a specification of a location at which a radio-based private network 103 is to be deployed for a customer. In one implementation, the site 438 is created by way of the RBPN management API 423 through the specification of a site name and an address. Latitude and longitude coordinates may be used in other examples. The RBPN management API 423 may associate a unique site identifier with the site 438.

The network plan 439 is a specification of a radio-based private network 103 to be deployed for a customer. In various implementations, a network plan 439 may include one or more identifiers of sites 438, premises, locations, or geographic areas to be covered, a quantity of cells, a maximum number of wireless devices 106 per cell, a quantity of wireless devices 106 or SIMs, device identification information and permissions, a desired measure of edge computing capacity in the radio-based private network 103, a desired maximum network latency, a desired bandwidth or network throughput for one or more classes of devices, one or more quality of service parameters for applications or services, a range of network addresses to be assigned to the wireless devices 106, an identifier of a type of spectrum to be used (e.g., Citizens Broadband Radio Service, television whitespaces, licensed spectrum, etc.), and/or other parameters that can be used to create a radio-based private network 103. A customer may manually specify one or more of these parameters via a user interface or an API. One or more of the parameters may be prepopulated as default parameters. In some cases, a network plan 439 may be generated for a customer based at least in part on automated site surveys using unmanned aerial vehicles. In some cases, the network plan 439 may incorporate thresholds and reference parameters determined at least in part on an automated probe of an existing private network of a customer.

The data plans 440 may correspond to one or more plans for accessing a radio-based private network 103 from wireless devices 106. A data plan 440 may include a network identifier, a data plan name, an uplink speed, a downlink speed, a unique identifier of the data plan 440, latency requirements, jitter requirements, and/or other data. Values of the parameters that define the data plans 440 may be used as a basis for a cloud service provider billing the customer under a utility computing model. For example, the customer may be billed a higher amount for lower latency targets and/or higher bandwidth targets in a service-level agreement (SLA), and the customer can be charged on a per-device basis, a per-cell basis, based on a geographic area served, based on spectrum availability, etc.

The cellular topology 442 includes an arrangement of a plurality of cells for a customer that takes into account reuse of frequency spectrum where possible given the location of the cells. The cellular topology 442 may be automatically generated given a site survey. In some cases, the number of cells in the cellular topology 442 may be automatically determined based on a desired geographic area to be covered, availability of backhaul connectivity at various sites, signal propagation, available frequency spectrum, and/or on other parameters. For radio-based private networks 103, the cellular topology 442 may be developed to cover one or more buildings in an organizational campus, one or more schools in a school district, one or more buildings in a university or university system, and other areas.

The spectrum assignments 445 include frequency spectrum that is available to be allocated for radio-based private networks 103 as well as frequency spectrum that is currently allocated to radio-based private networks 103. The frequency spectrum may include spectrum that is publicly accessible without restriction, spectrum that is individually owned or leased by customers, spectrum that is owned or leased by the provider, spectrum that is free to use but requires reservation, and so on.

The device data 448 corresponds to data describing wireless devices 106 that are permitted to connect to the radio-based private network 103. This device data 448 includes corresponding users, account information, billing information, data plan 440, permitted applications or uses, an indication of whether the wireless device 106 is mobile or fixed, a location, a current cell, a network address, device identifiers (e.g., International Mobile Equipment Identity (IMEI) number, International Mobile Subscriber Identity (IMSI) numbers, Equipment Serial Number (ESN), Media Access Control (MAC) address, Subscriber Identity Module (SIM) number, embedded SIM (eSIM) number, etc.), and so on.

The RBPN metrics 451 include various metrics or statistics that indicate the performance or health of the radio-based private network 103. Such RBPN metrics 451 may include bandwidth metrics, dropped packet metrics, signal strength metrics, latency metrics, and so on. The RBPN metrics 451 may be aggregated on a per-device basis, a per-cell basis, a per-customer basis, etc.

The customer billing data 454 specifies charges that the customer is to incur for the operation of the radio-based private network 103 for the customer by the provider. The charges may include fixed costs based upon equipment deployed to the customer and/or usage costs based upon utilization as determined by usage metrics that are tracked. In some cases, the customer may purchase the equipment up-front and may be charged only for bandwidth or backend network costs. In other cases, the customer may incur no up-front costs and may be charged purely based on utilization. With the equipment being provided to the customer based on a utility computing model, the cloud service provider may choose an optimal configuration of equipment in order to meet customer target performance metrics while avoiding overprovisioning of unnecessary hardware.

The radio unit configuration data 457 may correspond to configuration settings for radio units deployed in radio-based private networks 103. Such settings may include frequencies to be used, protocols to be used, modulation parameters, bandwidth, network routing and/or backhaul configuration, location, and height for the radio unit, and so on.

The antenna configuration data 460 may correspond to configuration settings for antennas, to include frequencies to be used, azimuth, vertical or horizonal orientation, beam tilt, height, and/or other parameters that may be controlled automatically (e.g., by network-connected motors and controls on the antennas) or manually by directing a user to mount the antenna in a certain way or make a physical change to the antenna.

The network function configuration data 463 corresponds to configuration settings that configure the operation of various network functions for the radio-based private network 103. In various embodiments, the network functions may be deployed in VM instances or containers located in computing devices 418 that are at cell sites, at customer aggregation sites, or in data centers remotely located from the customer. Non-limiting examples of network functions may include an access and mobility management function, a session management function, a user plane function, a policy control function, an authentication server function, a unified data management function, an application function, a network exposure function, a network function repository, a network slice selection function, and/or others. The network function workloads 466 correspond to machine images, containers, or functions to be launched in the allocated computing capacity 421 to perform one or more of the network functions.

The customer workloads 469 correspond to machine images, containers, or functions of the customer that may be executed alongside or in place of the network function workloads 466 in the allocated computing capacity 421. For example, the customer workloads 469 may provide or support a customer application or service. In various examples, the customer workloads 469 relate to factory automation, autonomous robotics, augmented reality, virtual reality, design, surveillance, and so on.

The client device 406 is representative of a plurality of client devices 406 that may be coupled to the network 412. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 406 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 436 and/or other applications. The client application 436 may be executed in a client device 406, for example, to access network content served up by the computing environment 403 and/or other servers, thereby rendering a user interface on the display. To this end, the client application 436 may comprise, for example, a browser, a dedicated application, etc., and the user interface may comprise a network page, an application screen, etc. The client device 406 may be configured to execute applications beyond the client application 436 such as, for example, email applications, social networking applications, word processors, spreadsheets, and/or other applications.

In some embodiments, the spectrum reservation service 410 provides reservations of frequency spectrum for customers' private networks. In one scenario, the spectrum reservation service 410 is operated by an entity, such as a third party, to manage reservations and coexistence in publicly accessible spectrum. One example of such spectrum may be the Citizens Broadband Radio Service (CBRS). In another scenario, the spectrum reservation service 410 is operated by a telecommunications service provider in order to sell or sublicense portions of spectrum owned or licensed by the provider.

Figure 5:
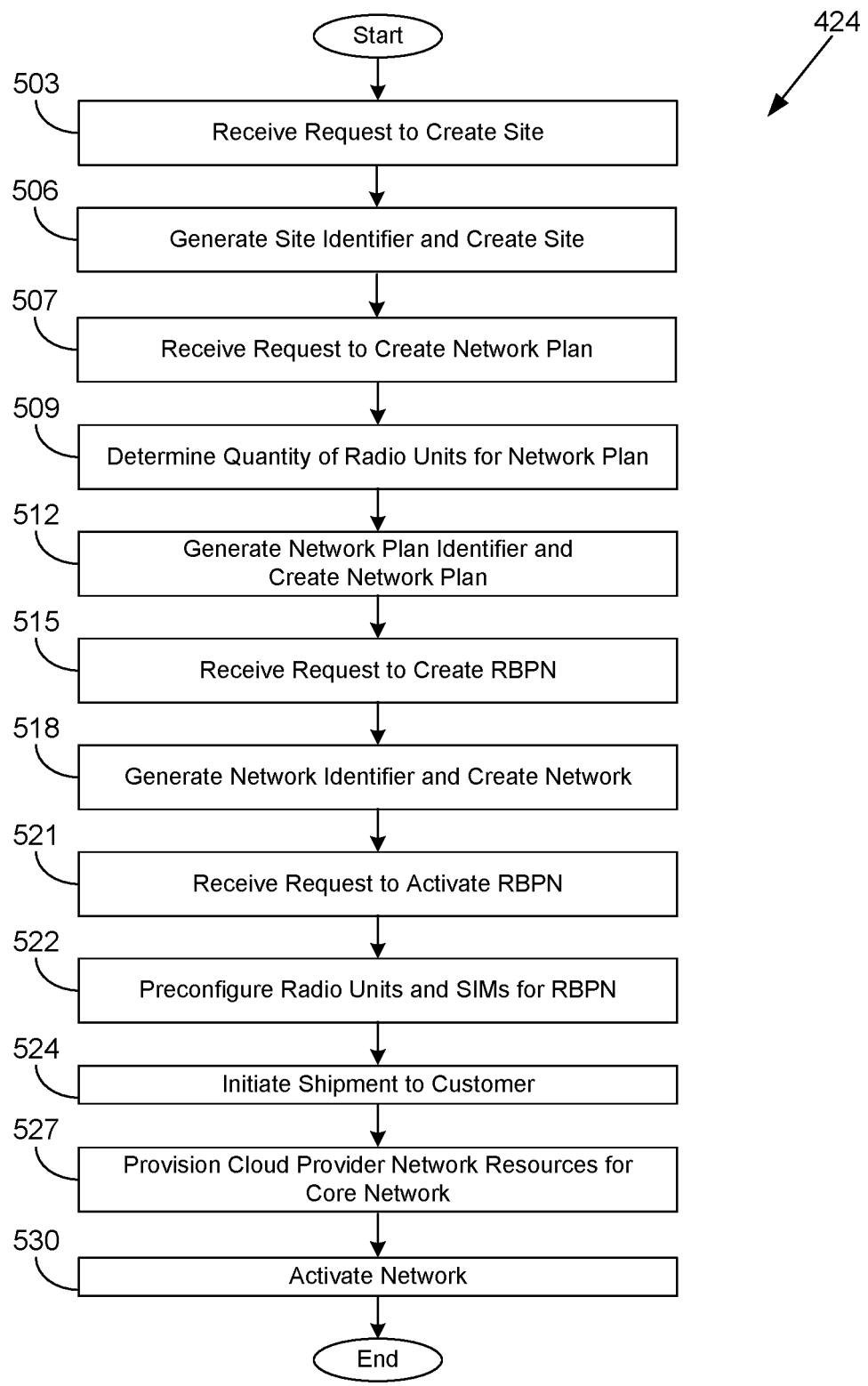
FIGS. 5 and 6 are flowcharts illustrating examples of functionality implemented as portions of a radio-based private network management service and a radio unit management service executed in a computing environment in the networked environment of FIG. 4 according to various embodiments of the present disclosure.

Referring next to FIG. 5, shown is a flowchart that provides one example of the operation of a portion of the RBPN management service 424 according to various embodiments. It is understood that the flowchart of FIG. 5 provides merely an example of the many different types of functional arrangements that may be employed to implement the operation of the portion of the RBPN management service 424 as described herein. As an alternative, the flowchart of FIG. 5 may be viewed as depicting an example of elements of a method implemented in the computing environment 403 (FIG. 4) according to one or more embodiments.

Beginning with box 503, the RBPN management service 424 receives a request to create a site 438 (FIG. 4) for a radio-based private network 103 (FIG. 1A). The request may be received via the RBPN management API 423 (FIG. 4) or by way of a user interface generated by the RBPN management service 424. Before the request is received, the RBPN management service 424 may authenticate the customer for access to an account associated with a cloud service provider and ensure that the account has access to the RBPN management API 423. In this regard, the RBPN management service 424 may operate based on the access control system of the cloud service provider. Further, the RBPN management service 424 may integrate one or more additional cloud services offered by the cloud service provider. Accordingly, the customer may launch cloud services from the cloud service provider to be executed on edge computing capacity deployed in the radio-based private network 103. In one such example, the customer may utilize a video stream processing service from the cloud service provider to process video streams captured by cameras on wireless devices 106.

The request to create a site 438 may specify a site name and a location in terms of an address or latitude/longitude coordinates. In box 506, the RBPN management service 424 generates a unique site identifier and creates the site 438. The RBPN management service 424 may then return the site identifier to the customer.

In box 507, the RBPN management service 424 receives a request to create a network plan 439 (FIG. 4). The request may be received via the RBPN management API 423 or by way of a user interface generated by the RBPN management service 424. For example, the request may specify a network plan name, a quantity of wireless devices 106 (FIG. 1A) or SIMs, a network address range for the wireless devices 106, a number of radio units or cells, a maximum number of wireless devices 106 per cell or radio unit, a measure of edge computing capacity to be deployed on site 438 (e.g., a quantity of a particular type of edge computing device), a type of spectrum to be used (e.g., TV whitespaces, CBRS, Wi-Fi, communication service provider-owned spectrum), and other parameters.

In box 509, the RBPN management service 424 determines a quantity of radio units for the network plan 439 (FIG. 4). In some cases, the quantity of radio units may be a customer-supplied parameter. Alternatively, the RBPN management service 424 may determine the quantity of radio units based at least in part on the number of wireless devices 106 to be served, a maximum number of wireless devices 106 per radio unit or cell, a quality of service parameter, spectrum availability at the site 438, a geographic area to be covered at the site 438, potential interference at the site 438, and/or on other factors. The RBPN management service 424 may also determine types of radio units; for example, indoor or outdoor models. In box 512, the RBPN management service 424 generates a unique network plan identifier and creates the network plan 439. The RBPN management service 424 may then return the network plan identifier to the customer.

In box 515, the RBPN management service 424 receives a request to create a radio-based private network 103. The request may specify an identifier of a site 438, an identifier of a network plan 439, a type of network (e.g., 4G, 5G, 6G, Wi-Fi, etc.), a network name, and so forth. A default network plan 439 with default parameters may be used if no network plan 439 is specified.

In box 518, the RBPN management service 424 generates a unique identifier for the radio-based private network 103 and creates a representation of the radio-based private network 103. The RBPN management service 424 may return the identifier for the radio-based private network 103 to the customer. The RBPN management service 424 may also return information such as an estimated time at which the radio-based private network 103 will be ready for activation, separately from any actions required of the customer to physically plug-in and connect the hardware.

Requests may also be received to create one or more data plans 440 (FIG. 4) for the radio-based private network 103. The requests may specify a network identifier, a data plan name, an uplink speed, a downlink speed, a maximum latency, a maximum jitter, and/or other parameters. Each wireless device 106 may be associated with a particular data plan 440 in the radio-based private network 103 for purposes of enforcing quality-of-service and billing.

In box 521, the RBPN management service 424 receives a request to activate a radio-based private network 103. The request may specify the unique identifier corresponding to the radio-based private network 103. Upon receiving this request, the RBPN management service 424 may lock the state of the radio-based private network 103 such that further modifications are not allowed while fulfillment and preconfiguration is occurring. The RBPN management service 424 may provide status updates to the customer, including the status of any shipments or of the network, as well as the status of any SIMs and their corresponding data plans 440 and IMSI identifiers.

In box 522, the RBPN management service 424 may preconfigure hardware for the radio-based private network 103, to include radio units, SIMs or eSIMs, edge computing devices including DUs and CUs, routers, network appliances, and/or other hardware. The RBPN management service 424 may preconfigure one or more computing devices to provide edge computing capacity as a provider substrate extension 224 (FIG. 2A) of a cloud provider network 203 (FIG. 2A). The RBPN management service 424 may generate an order for hardware such as the radio units and SIMs and then transmit the order to one or more vendor computing devices 408 (FIG. 4) corresponding to the vendors. For example, an order for radio units may specify a model, quantity, and a radio unit management service 427 endpoint. An order for SIMs may specify an IMSI range and a quantity. In some implementations, eSIMs may be utilized instead of physical SIMs. In some cases, a manual approval may be required prior to sending the orders to the vendors. The vendors may return identity provisioning information for configuration, including public/private keys, certificates, and/or endpoint information. Upon receipt of the hardware, the devices may be connected to the network 412 (FIG. 4) as predeployed devices 409 and configuration settings may be established on the predeployed devices 409 to implement the radio-based private network 103.

In box 524, the RBPN management service 424 initiates one or more shipments of the radio units, SIMs, and/or other hardware that has been preconfigured to the customer. For example, the shipments may be directed to an address specified in the site 438, shipping labels may be generated and manifests transmitted to one or more shipping carriers. In some cases, shipments may be drop shipped from vendors.

In box 527, the RBPN management service 424 provisions one or more computing resources in the cloud provider network 203 to function as a core network 118 (FIG. 1A) for the radio-based private network 103. This may be timed to occur before the hardware is delivered to the customer. In some cases, the computing resources of the core network 118 may be wholly or partly provisioned on edge computing capacity at the customer's site within a provider substrate extension 224. The resources may be in a particular region 306 (FIG. 3A) of a plurality of regions 306 of the cloud provider network 203, and the customer may specify the particular region 306. The quantity of resources may be configured based upon the data plans 440 and the number of wireless devices 106. As part of provisioning the resources, the RBPN management service 424 may provision a virtual network link for control plane network traffic for the radio access network at the customer location to the resources in the particular region 306. The radio access network may be configured such that a loss of connectivity via the virtual network link for the control plane network traffic does not impact connectivity, at least initially, in the radio access network for connections among the wireless devices 106 of the radio access network with other wireless devices 103 of the radio access network.

In box 530, the RBPN management service 424 activates the radio-based private network 103 in response to a request from the customer or in response to detecting that various hardware components have been connected to the network 412 at the customer's site 438. At this point, the lock on configuration changes may be removed and the customer may submit configuration changes for the radio-based private network 130, including updating the network plan 439, increasing the number of SIMs, increasing the number of cells, and so on. The RBPN management service 424 may return a response to the customer indicating when the activation will occur. Thereafter, the operation of the portion of the RBPN management service 424 ends.

Figure 6:
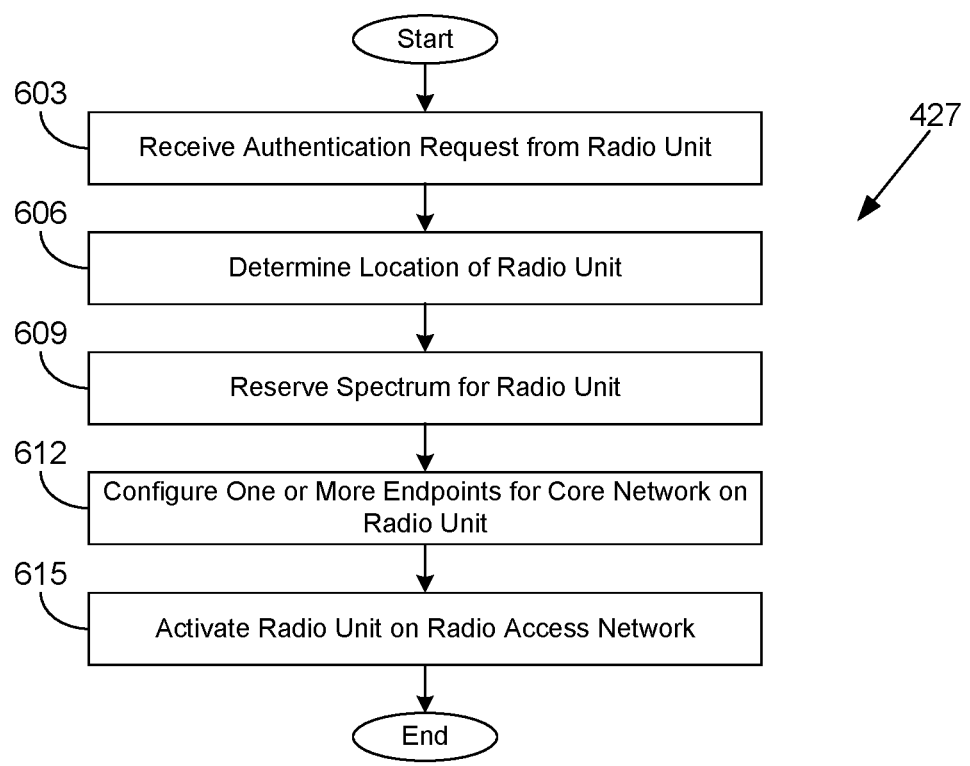

Turning now to FIG. 6, shown is a flowchart that provides one example of the operation of a portion of the radio unit management service 427 according to various embodiments. It is understood that the flowchart of FIG. 6 provides merely an example of the many different types of functional arrangements that may be employed to implement the operation of the portion of the radio unit management service 427 as described herein. As an alternative, the flowchart of FIG. 6 may be viewed as depicting an example of elements of a method implemented in the computing environment 403 (FIG. 4) according to one or more embodiments.

Beginning with box 603, the radio unit management service 427 receives an authentication request from a radio unit. For example, the radio unit may have been shipped to a customer for use with the radio-based private network 103 (FIG. 1A), with some level of preconfiguration to contact the radio unit management service 427. Upon being turned on and being physically connected to a network, the radio unit communicates with the radio unit management service 427 with the authentication request.

In box 606, the radio unit management service 427 determines the location of the radio unit. For example, the radio unit may present a set of coordinates (latitude and longitude) to the radio unit management service 427. The radio unit may include a Global Positioning System (GPS) or similar device in order to automatically determine a location. The radio unit may also provide a height.

In box 609, the radio unit management service 427 may communicate with a spectrum reservation service 410 (FIG. 4) in order to reserve spectrum for use by the radio unit at the location. For example, the radio unit management service 427 may send a request to reserve one or more CBRS frequencies or television whitespace frequencies for the radio unit. In some embodiments, the radio unit management service 427 may dynamically update one or more parameters stored on the radio unit so that the radio unit can communicate directly with the spectrum reservation service 410 in order to reserve spectrum. For example, the radio unit management service 427 may establish or configure one or more parameters on the radio unit relating to channel bandwidth, frequencies, neighboring cell information, information to assist wireless devices 106 with roaming, and/or other parameters. The radio unit management service 427 may configure the radio unit with one or more parameters that enable the radio unit to communicate with the spectrum reservation service 410.

In box 612, the radio unit management service 427 may configure one or more endpoints for the core network 118 (FIG. 1A) on the radio unit. Such endpoints may be configured, for example, for the access mobility function (AMF) or mobility management entity (MME) in the core network 118. In other implementations where the radio unit is an access point for Wi-Fi-type networks, the radio unit management service 427 may instead configure the access point with certificate-based identity management to manage connections. In box 615, the radio unit management service 427 activates the radio unit on the radio access network of the radio-based private network 103. Thereafter, the operation of the portion of the radio unit management service 427 ends.

Figure 7:
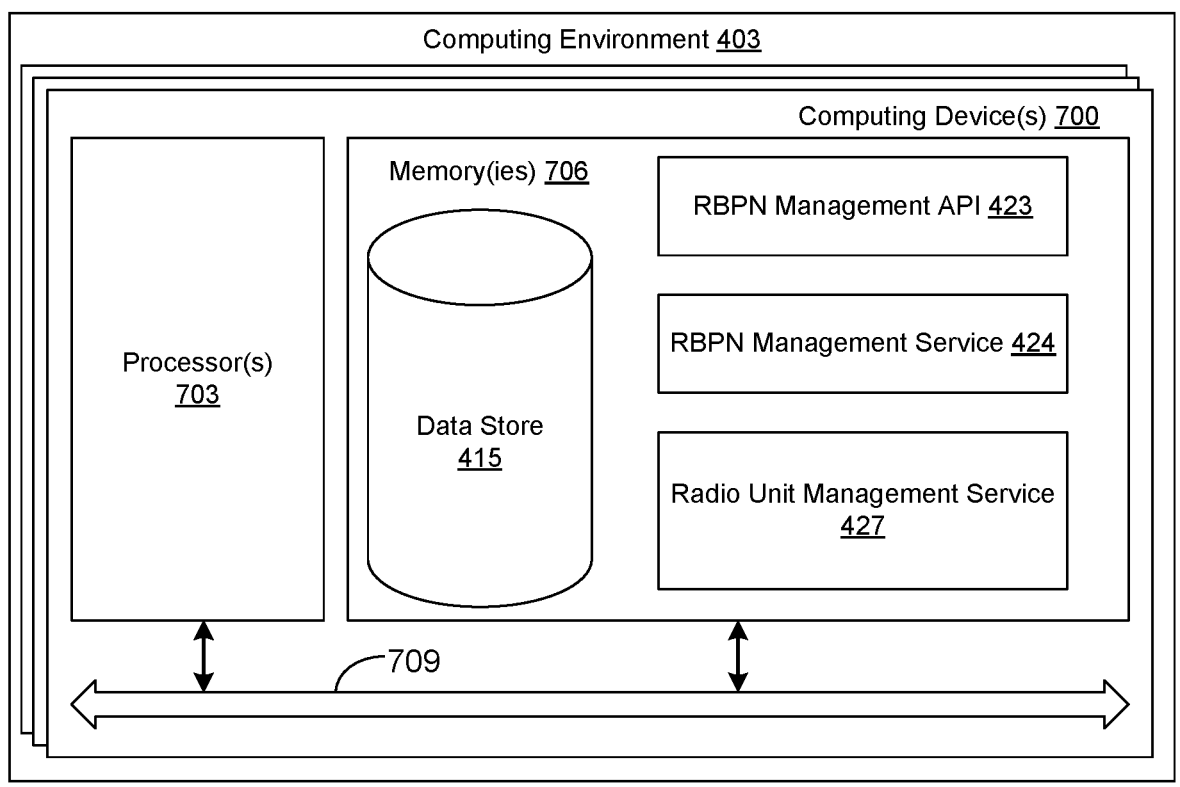
FIG. 7 is a schematic block diagram that provides one example illustration of a computing environment employed in the networked environment of FIG. 4 according to various embodiments of the present disclosure.

With reference to FIG. 7, shown is a schematic block diagram of the computing environment 403 according to an embodiment of the present disclosure. The computing environment 403 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the RBPN management API 423, the RBPN management service 424, the radio unit management service 427, and potentially other applications. Also stored in the memory 706 may be a data store 415 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the RBPN management API 423, the RBPN management service 424, the radio unit management service 427, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-6 show the functionality and operation of an implementation of portions of the RBPN management service 424 and the radio unit management service 427. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5-6 show a specific order of execution, it is understood that the order of execution may differ from that which is depicted. For example, the order of execution of two or more blocks may be scrambled relative to the order shown. Also, two or more blocks shown in succession in FIGS. 5-6 may be executed concurrently or with partial concurrence. Further, in some embodiments, one or more of the blocks shown in FIGS. 5-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the RBPN management API 423, the RBPN management service 424, and the radio unit management service 427, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the RBPN management API 423, the RBPN management service 424, and the radio unit management service 427, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 403.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
a provider network; and
at least one computing device implementing a radio-based private network management service configured to at least:
receive a request via an interface from a customer to create a radio-based private network for the customer, the request specifying a quantity of wireless devices that the radio-based network will support;
determine a radio unit quantity for a radio access network of the radio-based private network based at least in part on the quantity of wireless devices;
preconfigure a plurality of radio units corresponding to the determined radio unit quantity to implement the radio access network;
initiate a shipment to the customer of the plurality of radio units that have been preconfigured to implement the radio access network; and
provision one or more resources in the provider network to function as a core network for the radio-based private network.

2. The system of claim 1, wherein the at least one computing device is further configured to at least preconfigure a plurality of subscriber identity modules (SIMs) corresponding to the quantity of wireless devices for the radio access network, wherein the shipment includes the plurality of SIMs.

3. The system of claim 1, wherein the at least one computing device is further configured to at least configure one or more parameters on a particular radio unit of the plurality of radio units to cause the particular radio unit to reserve frequency spectrum from a spectrum registration service for the particular radio unit based at least in part on a location of the particular radio unit.

4. The system of claim 1, wherein the at least one computing device is further configured to at least determine a location in the provider network for provisioning the one or more resources based at least in part on a network latency between the radio access network and the location.

5. The system of claim 1, wherein the at least one computing device is further configured to at least determine a location in the provider network for provisioning the one or more resources based at least in part on a location specification in the request.

6. A computer-implemented method, comprising:
- receiving a request via an interface to create a radio-based private network for a customer, the request specifying a quantity of wireless devices that will connect to the radio-based network;
- determining a quantity of a plurality of radio units for a radio access network of the radio-based private network based at least in part on the quantity of wireless devices;
- preconfiguring the determined quantity of the plurality of radio units to implement the radio access network;
- initiating a shipment to the customer of the plurality of radio units that have been preconfigured to implement the radio access network; and
- provisioning one or more resources in a provider network to function as a core network for the radio-based private network.

7. The computer-implemented method of claim 6, further comprising determining a location in the provider network for provisioning the one or more resources based at least in part on a network latency between the radio access network and the location.

8. The computer-implemented method of claim 6, further comprising determining a location in the provider network for provisioning the one or more resources based at least in part on a location specification in the request.

9. The computer-implemented method of claim 6, further comprising:
- preconfiguring an edge computing device to implement at least one radio access network function for one or more of the plurality of radio units;
- preconfiguring the edge computing device to communicate with the one or more resources in the provider network that function as the core network; and
- initiating a shipment to the customer of the edge computing device.

10. The computer-implemented method of claim 6, further comprising reserving radio spectrum for the radio-based private network via a spectrum reservation service based at least in part on a location specified in the request.

11. The computer-implemented method of claim 6, further comprising provisioning a virtual network link for control plane network traffic from the radio access network to the one or more resources in the provider network.

12. A non-transitory computer-readable medium embodying instructions executable in at least one computing device, wherein when executed the instructions cause the at least one computing device to at least:
- receive a request via an interface to create a radio-based private network for a customer, the request indicating a quantity of wireless devices for the radio-based private network;
- determine a radio unit quantity for a radio access network of the radio-based private network based at least in part on the quantity of wireless devices;
- preconfigure a plurality of radio units corresponding to the determined radio unit quantity to implement the radio access network;
- initiate a shipment to the customer of the plurality of radio units that have been preconfigured to implement the radio access network; and
- provision one or more resources in a provider network to function as a core network for the radio-based private network.

13. The non-transitory computer-readable medium of claim 12, wherein the instructions further cause the at least one computing device to at least:
- generate an order for one or more of the plurality of radio units; and
- transmit the order for the one or more of the plurality of radio units to one or more vendor computing devices.

14. The non-transitory computer-readable medium of claim 13, wherein the instructions further cause the at least one computing device to at least receive a listing of serial numbers corresponding to the one or more of the plurality of radio units from the one or more vendor computing devices.

15. The non-transitory computer-readable medium of claim 12, wherein the instructions further cause the at least one computing device to at least prevent a change to a configuration of the radio-based private network via the interface until the shipment is delivered.

16. The non-transitory computer-readable medium of claim 12, wherein the instructions further cause the at least one computing device to at least:
- receive an authentication request from a particular radio unit of the plurality of radio units;
- determine a location of the particular radio unit;
- reserve frequency spectrum from a spectrum registration service for the particular radio unit based at least in part on the location; and
- configure one or more endpoints for the core network on the particular radio unit.

17. The non-transitory computer-readable medium of claim 12, wherein the instructions further cause the at least one computing device to at least determine a location in the provider network for executing the one or more resources based at least in part on the request.

18. The non-transitory computer-readable medium of claim 12, wherein the instructions further cause the at least one computing device to at least preconfigure a plurality of subscriber identity modules (SIMs) corresponding to the quantity of wireless devices for the radio access network.

19. The non-transitory computer-readable medium of claim 12, wherein the instructions further cause the at least one computing device to at least configure one or more parameters on a particular radio unit of the plurality of radio units to cause the particular radio unit to reserve frequency spectrum from a spectrum registration service for the particular radio unit based at least in part on a location of the particular radio unit.

20. The non-transitory computer-readable medium of claim 12, wherein the instructions further cause the at least one computing device to at least determine a location in the provider network for provisioning the one or more resources based at least in part on a network latency between the radio access network and the location.

* * * * *